United States Patent
Sun et al.

(10) Patent No.: US 10,210,060 B2
(45) Date of Patent: Feb. 19, 2019

(54) ONLINE NVM FORMAT UPGRADE IN A DATA STORAGE SYSTEM OPERATING WITH ACTIVE AND STANDBY MEMORY CONTROLLERS

(71) Applicant: HEWLETT PACKARD ENTERPRISE DEVELOPMENT LP, Houston, TX (US)

(72) Inventors: Yinglin Sun, San Jose, CA (US); Nimesh Bhagat, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 106 days.

(21) Appl. No.: 15/242,942

(22) Filed: Aug. 22, 2016

(65) Prior Publication Data

US 2018/0052750 A1 Feb. 22, 2018

(51) Int. Cl.
*G06F 11/00* (2006.01)
*G06F 11/20* (2006.01)
*G06F 3/06* (2006.01)
*G06F 11/14* (2006.01)

(52) U.S. Cl.
CPC ........ *G06F 11/2069* (2013.01); *G06F 3/0607* (2013.01); *G06F 3/0617* (2013.01); *G06F 3/0647* (2013.01); *G06F 3/0685* (2013.01); *G06F 3/0688* (2013.01); *G06F 11/1451* (2013.01); *G06F 11/2058* (2013.01); *G06F 2201/84* (2013.01)

(58) Field of Classification Search
CPC ............. G06F 11/1451; G06F 11/2058; G06F 11/2069
See application file for complete search history.

(56) References Cited

U.S. PATENT DOCUMENTS

| | | | |
|---|---|---|---|
| 2004/0255187 A1* | 12/2004 | Gabriel Vecoven | ........................ G06F 11/0724 714/6.31 |
| 2011/0179311 A1* | 7/2011 | Nachimuthu | ....... G06F 11/3676 714/42 |
| 2015/0012699 A1* | 1/2015 | Rizzo | .................. G06F 12/0866 711/113 |

\* cited by examiner

*Primary Examiner* — Charles Ehne

(57) ABSTRACT

Methods and systems are presented for upgrading non-volatile memories (NVMs) of controllers in a storage system. One method includes operations for taking a second controller off-line, wherein NVMs in first and second controllers are initially mirrored in a first format, with the first controller active and the second controller as standby. The method includes reformatting the second NVM in the second controller to a second format, and blocking handling of IOs at the first controller after reformatting of the second NVM is complete. The method includes migrating metadata to the second NVM from the first NVM, and bringing the second controller back on-line as standby. The method includes failing over to the second controller, and reformatting the first NVM to the second format. The method includes updating metadata in the first NVM to mirror metadata in the second NVM, and bringing the first controller back on-line in standby.

22 Claims, 12 Drawing Sheets

2

ONLINE NVM FORMAT UPGRADE IN A DATA STORAGE SYSTEM OPERATING WITH ACTIVE AND STANDBY MEMORY CONTROLLERS

TECHNICAL FIELD

The present embodiments relate to methods, systems, and programs for upgrading a networked data storage system, and more particularly, methods, systems, and computer programs for reformatting non-volatile random access memories (NVRAMs) in memory controllers of a data storage system.

BACKGROUND

Network storage, also referred to as network storage systems or data storage systems, is computer data storage connected to a computer network providing data access to heterogeneous clients. Some data storage systems include non-volatile memory (NVM) (e.g., non-volatile random access memory) used during write operations for desirable speed performance. Data is written to NVM along with corresponding metadata. By way of example, one part of the NVM is reserved for metadata and another part is reserved for data. In part, a NVM format defines sizes for the metadata objects.

There are various scenarios where updating the NVM format is desired. For example updating is desired in the following cases: when upgrading the controller (e.g., upgrading to a more powerful controller) along with its increase in NVM; changing the NVRAM partition between the portion holding metadata and the portion holding data; decreasing the page size; performing an NVM layout change (e.g., adding one or more NVM headers), etc. These NVM format upgrades may be triggered through controller software version updates, maintenance releases, patch releases, customer service requests (e.g., increase in speed), etc.

However, NVM format upgrade has heretofore resulted in memory loss and/or degradation in the availability of the memory system due to scheduled system outages. Typically, the memory controllers managing memory access are completely brought off-line to perform the NVRAM format upgrade. That is, the controllers in the system are shut down gracefully, replaced and/or reformatted, and then powered back on to operate under the new format. This is undesirable as the data storage system is unable to handle requests for data during the reformatting process.

What is needed is a network storage device, software, and systems that provide for NVRAM format upgrade without any substantial or noticeable downtime in the storage system while maintaining data integrity.

It is in this context that embodiments arise.

SUMMARY

The present embodiments relate to solving one or more problems found in the related art, and specifically to provide for hot NVM (e.g., non-volatile random access memory, non-volatile dual in-line memory module, etc.) upgrading in memory controllers of a data storage system. In one example, a data storage array is configured such that write operations are performed utilizing NVM, which allow for immediate acknowledgments of the writes to the host (e.g., fast response time). The NVM is configured for persistent storage via capacitive elements. Once the data is written to NVM, the data is then written to disk, and cached in a solid state drive (SSD) if the data is cache worthy. Typically, the NVM partitions and stores data, to include corresponding metadata, according to a specific format (e.g., defined size of the data, etc.). For example, metadata objects and data objects correspond in a one-to-one relationship, in one implementation, or have other relationships in other implementations. In some cases, there is a need to update the format of the NVM, for example to allow for a change in the size of the data objects to be written to the NVM. Embodiments of the present disclosure provide for hot NVM format upgrades/updates without any substantial or noticeable downtime when the storage array is operationally serving host requests. Specifically, a framework process is disclosed that allows for NVM format upgrades that uses an exchange process between the NVM of the active controller and the NVM of the standby controller. The framework process can support upgrading to different types or requirements of formatting. As such, the reformatting of the NVM of corresponding memory controllers is performed while the storage array is actively servicing input/output (IO) requests from one or more hosts.

It should be appreciated that the present embodiments can be implemented in numerous ways, such as a method, an apparatus, a system, a device, or a computer program on a computer readable medium. Several embodiments are described below.

In one embodiment, a method for upgrading data storage systems that uses a standby NVM as a staging buffer is disclosed, and is performed on a data storage system including a first controller in an active mode and a second controller in a standby mode, wherein non-volatile memories (NVMs) in the first and second controllers are initially mirrored in a first format. The method includes taking the second controller off-line such that data in a second NVM of the second controller is stale, and reformatting the second NVM to a second format while the second controller is off-line. The method includes operating the second NVM as a staging buffer to maintain data integrity of the data storage system. The method includes performing a failover to the second controller, and reformatting the first NVM in the first controller after failover to the second controller is complete. The method includes updating metadata in the first NVM to mirror metadata in the second NVM while the first controller is off-line.

In one embodiment, a method includes operations for taking a second controller off-line such that data in a second NVM of the second controller is stale in a data storage system including a first controller having a first NVM and a second controller having a second NVM, wherein the first and second NVMs are initially mirrored in a first format, and the first controller initially operates in an active mode and the second controller operates in a standby mode. The method includes reformatting the second NVM in the second controller to a second format while the second controller is off-line, and blocking handling of IOs at the first controller after reformatting of the second NVM is complete. While the first controller is blocked from handling IOs, the method further includes migrating data (to include metadata) stored in the first NVM to the second NVM of the second controller. The method includes bringing the second controller back on-line, wherein the second controller is in the standby state, taking the first controller off-line by performing a failover to the second controller after the second controller is back on-line, wherein the second controller is in the active state, and wherein data in the first NVM is stale. The method includes reformatting the first NVM in the first controller to the second format after failover to the second controller has completed, and updating metadata in the first NVM in the first controller to mirror data in the second NVR NVM AM in the second controller while the first controller is off-line. The method includes bringing the first controller back on-line in the standby state after the data is completely mirrored in both NVMs.

In another embodiment, a data storage system includes first and second memory controllers, each of which comprises a central processing unit (CPU) and a non-volatile memory (NVM) for storing incoming write requests. Specifically, the first controller includes a first NVM for handling IOs and a first CPU, wherein the first controller is in an active mode in an initial state of the storage system. The second controller includes a second NVM for handling IOs and a second CPU, wherein the second controller is in a standby mode in the initial state. The data storage system includes a solid state drives/memory (SSD) configured as a read cache memory, and a hard drive (HDD) configured for permanent data storage. During reformatting of the first NVM and the second NVM, the first controller and the second controller are configured to take the second controller off-line such that data in a second NVM of the second controller is stale; reformat the second NVM in the second controller to a second format while the second controller is off-line; block handling of IOs at the first controller after reformatting of the second NVM is complete; while the first controller is blocked from handling IOs, migrate data stored in the first NVM to the second NVM of the second controller; bring the second controller back on-line, wherein the second controller is in the standby state; take the first controller off-line by performing a failover to the second controller after the second controller is back on-line, wherein the second controller is in the active state, wherein data in the first NVM is stale; reformat the first NVM in the first controller to the second format after failover to the second controller is complete; update data in the first NVM in the first controller to mirror metadata in the second NVM in the second controller while the first controller is off-line; and bring the first controller back on-line in the standby state.

In yet another embodiment, a non-transitory computer-readable storage medium, storing a computer program for upgrading a data storage system, and more specifically for upgrading NVM in one or more controllers of the data storage system, includes program instructions for taking a second controller off-line such that data in a second NVM of the second controller is stale, wherein the second controller is included in a data storage system with a backup controller configuration, wherein the data storage system comprises a first controller and the second controller, wherein non-volatile memories (NVMs) in the first and second controllers are initially mirrored in a first format, wherein in an initial state the first controller is in an active mode and the second controller is in a standby mode. The storage medium further includes program instructions for reformatting the second NVM in the second controller to a second format while the second controller is off-line, and for blocking handling of IOs at the first controller after reformatting of the second NVM is complete. The storage medium further includes program instructions for migrating data stored in the first NVM to the second NVM of the second controller while the first controller is blocked from handling IOs. The storage medium further includes program instructions for bringing the second controller back on-line, wherein the second controller is in the standby state, and for taking the first controller off-line by performing a failover to the second controller after the second controller is back on-line, wherein the second controller is in the active state, and wherein data in the first NVM is stale. The storage medium further includes program instructions for reformatting the first NVM in the first controller to the second format after failover to the second controller is complete, and for updating data in the first NVM in the first controller to mirror data in the second NVM in the second controller while the first controller is off-line. The storage medium further includes program instructions for bringing the first controller back on-line in the standby state.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

DETAILED DESCRIPTION

Figure 1:
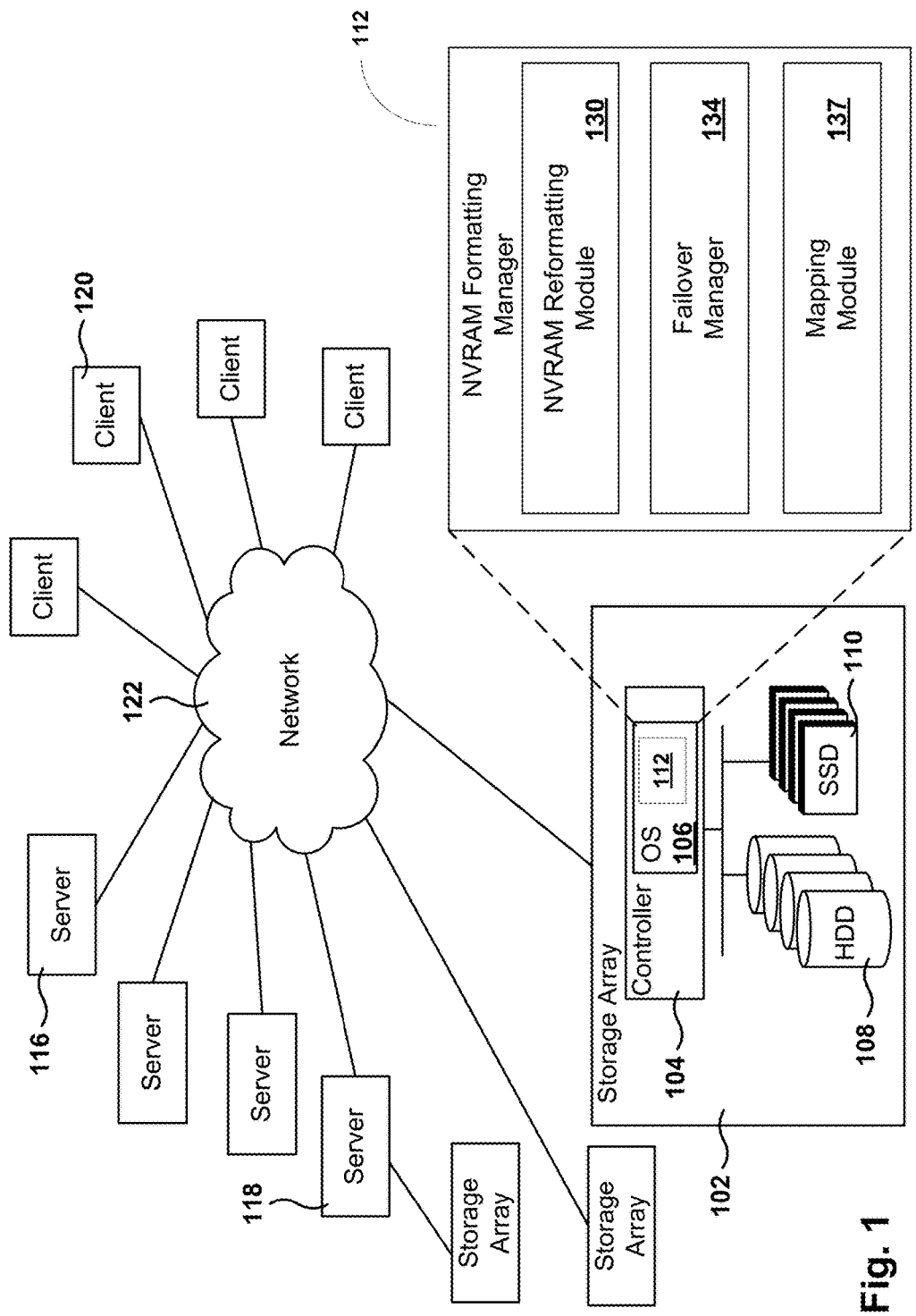
FIG. 1 depicts a system with network storage, according to one embodiment.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods that provide for hot NVM upgrading in memory controllers of a data storage system, that for example is configured such that write operations are performed utilizing NVM, which allow for immediate acknowledgments of the writes to the host. The NVM is powered by a separate power supply (e.g., capacitive elements, a super capacitor, etc.), which makes the memory persistent. Once the data is written to NVM, the data is then written to hard disk drives (HDD), and cached in a solid state drive (SSD) if the data is cache worthy. The NVM of a memory controller is partitioned to store data (to include corresponding metadata) according to a specific format. For example, the NVM format may define the size of the data, how the NVM RAM is partitioned, etc. Typically, metadata objects and data objects correspond in a one-to-one relationship. In some cases, there is a need to update the format of the NVRAM, for example to allow for a change in the size of the data objects to be written to the NVRAM. Embodiments of the present disclosure provide for hot NVM format upgrades/updates. In that manner NVM upgrading may be performed without any substantial or noticeable downtime to the host that is delivering IOs to the data storage system. In embodiments, a framework process is disclosed that allows for NVM format upgrades that is using a data exchange process between the NVM of the active controller and the NVM of the standby controller. The framework process supports upgrading to different types or requirements of formatting. As such, the reformatting of the NVM of corresponding memory controllers to any type of format can be performed while the storage array is actively servicing input/output (TO) requests from one or more hosts. The framework process generally involves operations including coordinating which controller is actively servicing IOs while reformatting of the off-line controller is performed, pausing the handling of IOs without causing faulty delays, migrating NVM data between the controllers, mirroring and catching up NVM data between the controllers, and initiating a failover process between the controllers. As a result, reformatting of NVMs of memory controllers for a data storage system is performed while the storage system is actively and continually servicing IOs from a host. It is in this context that embodiments of the invention arise.

With the above general understanding of the various embodiments, example details of the embodiments will now be described with reference to the various drawings. Similarly numbered elements and/or components in one or more figures are intended to generally have the same configuration and/or functionality. It will be apparent, that the present embodiments may be practiced without some or all of these specific details. In other instances, well-known process operations have not been described in detail in order not to unnecessarily obscure the present embodiments.

While embodiments of the present disclosure are described within the context of a data storage system including non-volatile random access memory (NVRAM), it is understood that the methods and systems described herein are generally applicable to non-volatile memories (NVMs). In particular, multiple types of NVMs are used in storage system, including NVRAM, NVDIMM, etc. As such, embodiments of the present disclosure are well suited for hot NVM upgrading in memory controllers of a data storage system. That is, the use of NVRAMs is representative of NVMs configured to implement embodiments of the present disclosure.

FIG. 1 depicts a system with network storage, according to one embodiment. The networked storage device, also referred to herein as a storage array 102 or a storage system, includes a controller 104 with a storage operating system 106, which is a multitasking system able to execute several tasks concurrently. One or more tasks are configured to process IO requests, and these tasks that process IOs are referred to herein as foreground tasks. Background tasks are tasks that do not cause a host initiator to wait for their output. For example, background tasks may include system maintenance tasks (e.g., processing an alert when resource consumption reaches a threshold, taking a scheduled snapshot, garbage collection (GC), etc.). More particularly, the operating system 106 is configured to perform hot NVRAM format upgrades for memory controllers providing access to data stored in one or more of NVRAM, read cache SSD, and HDD.

In the example architecture of FIG. 1, one or more storage arrays 102 provide storage services to one or more servers 116, 118 (which are referred to herein as hosts) and to one or more clients 120. The configuration will depend on the implementation of the storage array and the demand by application. Network 122 provides transport for the data exchanges between the storage array 102 and servers 116 or clients 120. In addition, server 118 may be directly connected to a storage array without communicating through network 122. Storage array 102 includes one or more memory controllers 104, one or more hard disk drives (HDD) 108, and one or more solid state drives (SSD) 110, also referred to herein as flash cache. Additional examples regarding the system are provided below. In one embodiment, the storage operating system 106 executing in the controller 104 includes an NVRAM formatting manager 112 configured for implementing a generic framework providing a process for performing hot NVRAM format upgrades to any specified or required formatting, so that NVRAM upgrading is performed without any substantial or noticeable downtime for a storage array 102 to a requesting host.

In one example, the NVRAM formatting manager 112 includes NVRAM reformatting module 130, failover manager 134, and mapping module 137 that are utilized when performing one or more tasks implementing a hot NVRAM format upgrade. In particular, the reformatting module 130 is configured to implement and/or control the operations implementing the generic framework to perform hot NVRAM format upgrades. The reformatting module 130 may call for failover manager 134 to implement specific operations provided in the generic framework that perform failover between two memory controllers. In addition, the reformatting module 130 may reference or call the mapping module 137 to perform necessary mapping operations when migrating data (to include metadata) between two controllers that may not be formatted similarly.

Figure 2:
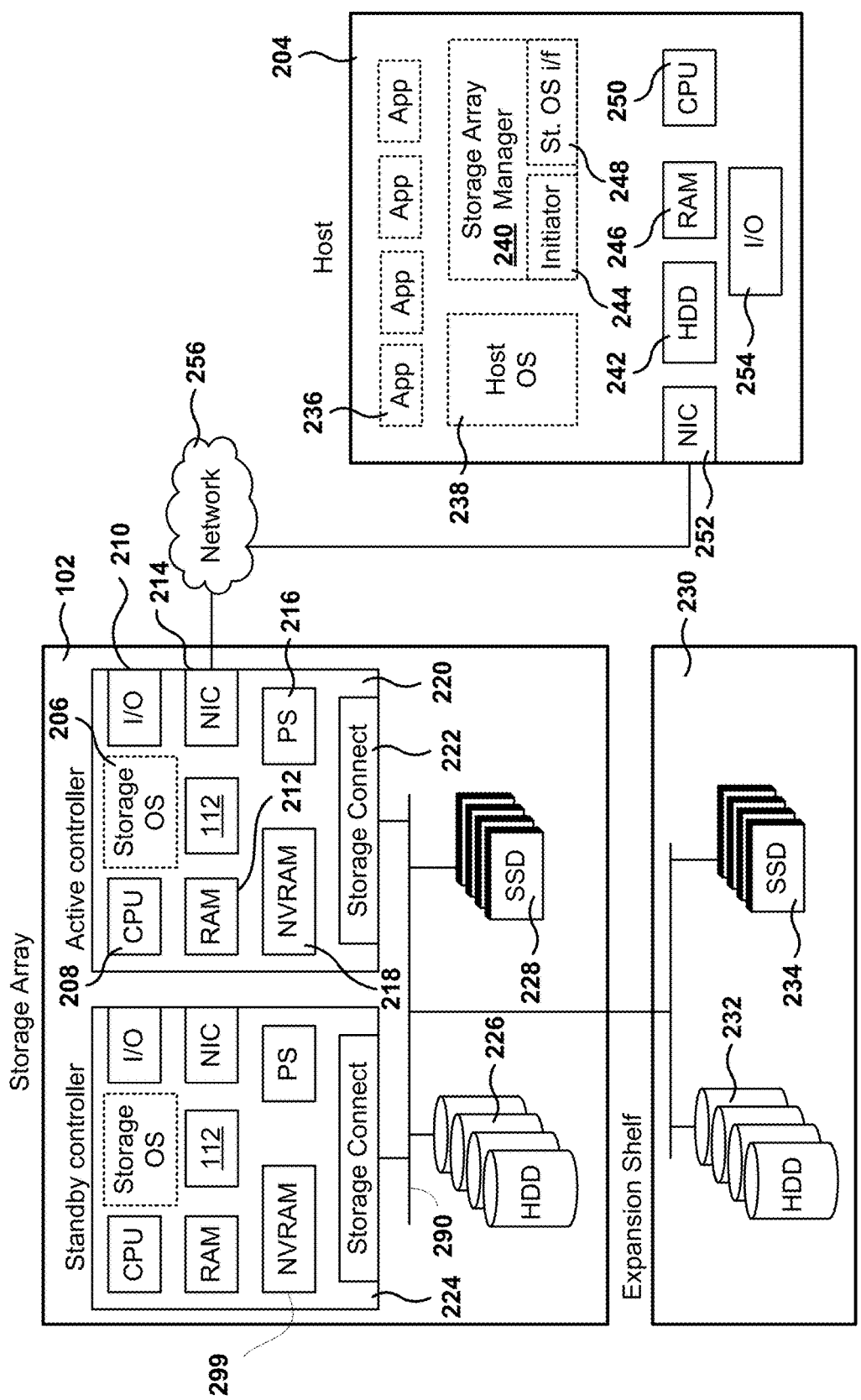
FIG. 2 illustrates the architecture of a storage array, according to one embodiment.

FIG. 2 illustrates an example architecture of a storage array 102, according to one embodiment. In one embodiment, storage array 102 includes an active controller 220, a standby controller 224, one or more HDDs 226, and one or more SSDs 228. It is important to note that either controller can operate in the active mode, and either controller can operate in the standby mode, such that when both controllers are on-line one controller is designated as the active controller and functions to service IOs from one or more hosts, while the other controller remains in standby mode ready to step in and handle the IOs when a failure (real or instantiated) to the active controller occurs. As such, the active controller 220 and the standby controller 224 are configured similarly and mirrored appropriately, such that either controller when designated active can access (e.g., write, read, etc.) data stored in any of the storage mediums of the storage array 102, including a corresponding NVRAM, read cache SSD 228, and HDD 226 to serve IOs from hosts. In one embodiment, the active controller 220 includes NVRAM 218, which in one implementation is used for immediately storing the incoming data (e.g., write data) as it arrives to the storage array. In that manner, storage array 102 provides immediate acknowledgment of a write request to the requesting host. After the data is processed (e.g., compressed and organized in segments (e.g., coalesced)), the data is transferred from the NVRAM 218 to HDD 226, or to read cache SSD 228 if the data is determined to be cache worthy, or to both.

The active controller 220 includes various components that enable efficient processing of read and write requests. For instance, data from a write operation is stored first in the NVRAM 218 of active controller 220, and provides for immediate acknowledgment of acceptance and storage of the data back to the host, thereby providing increased storage system performance. Because the data is later stored in HDD 226 and/or SSD 228, a later read access will retrieve the data from the location giving the quickest access. For example, the data is retrieved from NVRAM 218 for the quickest response time if the data is still available. Further description of the operations performed during write and read requests is provided in relation to FIGS. 3, 4, and 8.

In addition, the active controller 220 further includes CPU 208, general-purpose RAM 212 (e.g., used by the programs executing in CPU 208), input/output module 210 for communicating with external devices (e.g., USB port, terminal port, connectors, plugs, links, etc.), one or more network interface cards (NICs) 214 for exchanging data packages through network 256, one or more power supplies 216, a temperature sensor (not shown), and a storage connect module 222 for sending and receiving data to and from the HDD 226 and SSD 228. In one embodiment, standby controller 224 includes the same components as active controller 220.

In one embodiment, bus 290 provides connectivity between the components of the active controller 220 and the components of the standby controller 224, for example to implement an active/standby array configuration, wherein the active controller 220 services IO requests from one or more hosts and the standby controller 224 services write cache mirroring requests (e.g., mirrors writes to NVRAM 218 to NVRAM 299) while remaining ready to assume the primary responsibility of servicing IOs when a failure occurs at the active controller 220. More particularly, bus 290 provides for communication between the active controller 220 and standby controller 224 when the NVRAM reformatting managers 112 in both controllers cooperatively act to implement hot NVRAM format upgrades. As such, NVRAM reformatting is accomplished internally within the storage arrays, and more specifically by the two controllers 220 and 224 in cooperation.

Active controller 220 is configured to execute one or more computer programs stored in RAM 212. One of the computer programs is the storage operating system (OS) used to perform operating system functions for the active controller device. In some implementations, one or more expansion shelves 230 may be coupled to storage array 102 to increase HDD 232 capacity, or SSD 234 capacity, or both.

In one embodiment, active controller 220 and standby controller 224 have their own NVRAMs, but they share HDDs 226 and SSDs 228. The standby controller 224 receives copies of what gets stored in the NVRAM 218 of the active controller 220 and stores the copies in its own NVRAM 299. If the active controller 220 fails, standby controller 224 takes over the management of the storage array 102. For example, one or both of the failover managers 134 in the controllers 220 and 224 implement and/or manage the failover process. When servers, also referred to herein as hosts, connect to the storage array 102, read/write requests (e.g., IO requests) are sent over network 256, and the storage array 102 stores the sent data or sends back the requested data to host 204.

Host 204 is a computing device including a CPU 250, memory (RAM) 246, permanent storage (HDD) 242, a NIC card 252, and an IO module 254. The host 204 includes one or more applications 236 executing on CPU 250, a host operating system 238, and a computer program storage array manager 240 that provides an interface for accessing storage array 102 to applications 236. Storage array manager 240 includes an initiator 244 and a storage OS interface program 248. When an IO operation is requested by one of the applications 236, the initiator 244 establishes a connection with storage array 102 in one of the supported formats (e.g., iSCSI, Fibre Channel, or any other protocol). The storage OS interface 248 provides console capabilities for managing the storage array 102 by communicating with the active controller 220 and the storage OS 206 executing therein.

More details are provided below regarding example elements in FIG. 2 with reference to FIGS. 3-8. It should be understood, however, that specific implementations may utilize different modules, different protocols, different number of controllers, etc., while still being configured to execute or process operations taught and disclosed herein. As such, the example structure of FIG. 2 should not be interpreted to be exclusive or limiting, but rather exemplary or illustrative.

Figure 3:
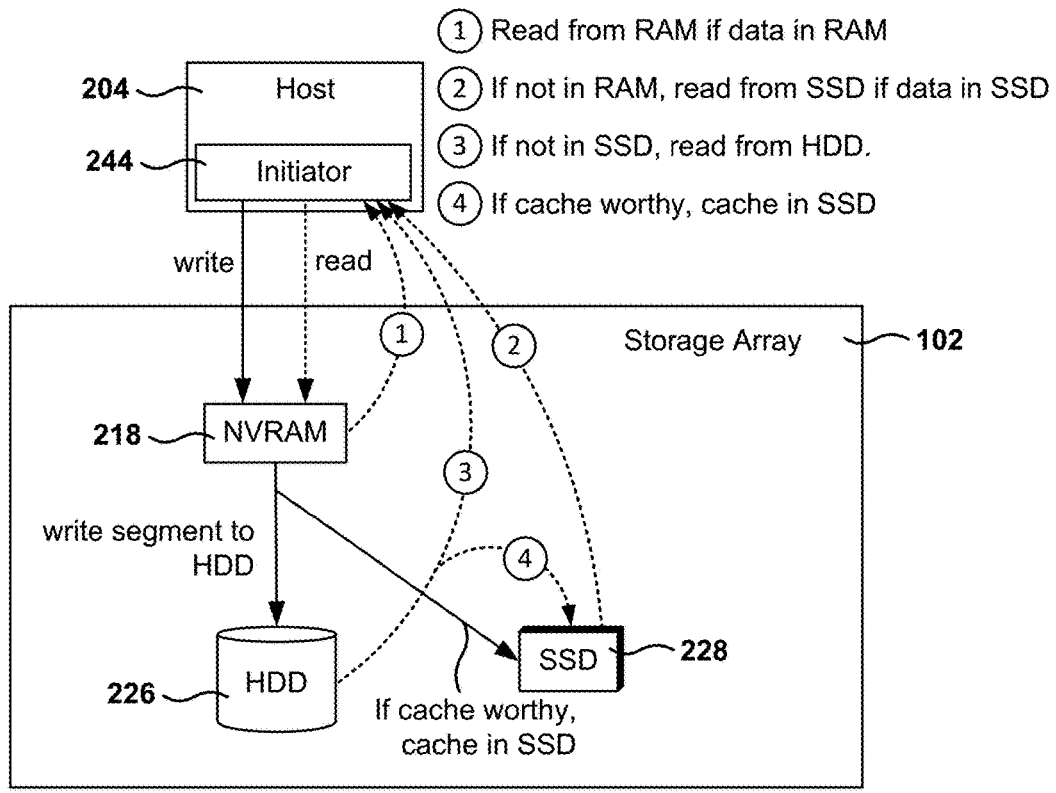
FIG. 3 illustrates read and write paths within the storage array, according to one embodiment.

FIG. 3 illustrates read and write paths within the storage array 102, according to one embodiment. Regarding the write path, the initiator 244 in the host 204 sends the write request to the storage array 102. As the write data comes in, the write data is written into NVRAM 218, and an acknowledgment is sent back to the initiator (e.g., the host or application making the request). In one embodiment, storage array 102 supports variable block sizes. Data blocks in the NVRAM 218 are grouped together to form a segment that includes a plurality of data blocks, which may be of different sizes. The segment is compressed and then written to HDD 226. More details are provided below regarding the transfer of data from the NVRAM 218 to HDD 226 with reference to FIG. 4. In addition, if the segment is considered to be cache-worthy (i.e., important enough to be cached or likely to be accessed again) the segment is also written to the SSD cache 228. In one embodiment, the segment is written to the SSD 228 in parallel while writing the segment to HDD 226.

In one embodiment, the performance of the write path is driven by the flushing of NVRAM 218 to disk 226. With regards to the read path, the initiator 244 sends a read request to storage array 102. The requested data may be found in any of the different levels of storage mediums of the storage array 102. First, a check is made to see if the data is found in RAM (not shown), which is a shadow memory of NVRAM 218, and if the data is found in RAM then the data is read from RAM and sent back to the initiator 244. In one embodiment, the shadow RAM memory (e.g., DRAM) keeps a copy of the data in the NVRAM and the read operations are served from the shadow RAM memory. When data is written to the NVRAM, the data is also written to the shadow RAM so the read operations can be served from the shadow RAM leaving the NVRAM free for processing write operations.

If the data is not found in the shadow RAM then a check is made to determine if the data is in cache, and if so (i.e., cache hit), the data is read from the flash cache 228 and sent to the initiator 244. If the data is not found in the NVRAM 218 nor in the flash cache 228, then the data is read from the hard drives 226 and sent to the initiator 244. In addition, if the data being served from hard disk 226 is cache worthy, then the data is also cached in the SSD cache 228.

Figure 4:
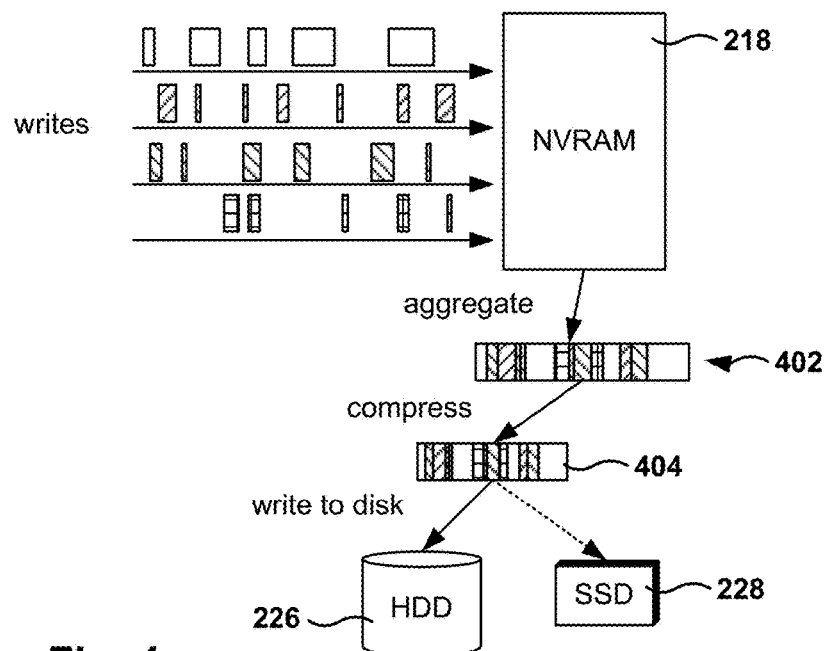
FIG. 4 illustrates the segmentation and compression of write data blocks before saving in hard disk, in accordance with one embodiment.

FIG. 4 illustrates the segmentation and compression of write data blocks before saving/writing to hard disk, in accordance with one embodiment. The different blocks arrive from one or more hosts to the storage array and then the blocks are stored in NVRAM 218. The incoming blocks are then aggregated into a segment 402, by concatenating the receiving blocks as they arrive to the NVRAM. It is noted that the blocks may have different sizes in one embodiment. The segment 402 is compressed 404 before transmittal to the disk, which results in time savings for the transmittal and savings in the space utilized in the hard drives 226. As noted above, if the data is cache-worthy then the data is also written to flash cache 228. This architecture is very efficient for random writes, as the data is not sorted before being sent to the hard drives, as it is often done in other storage architectures. Here, the data is fluently captured, segmented, compressed, and then sent to the drives, which results in a fast write path for the incoming data.

Figure 5:
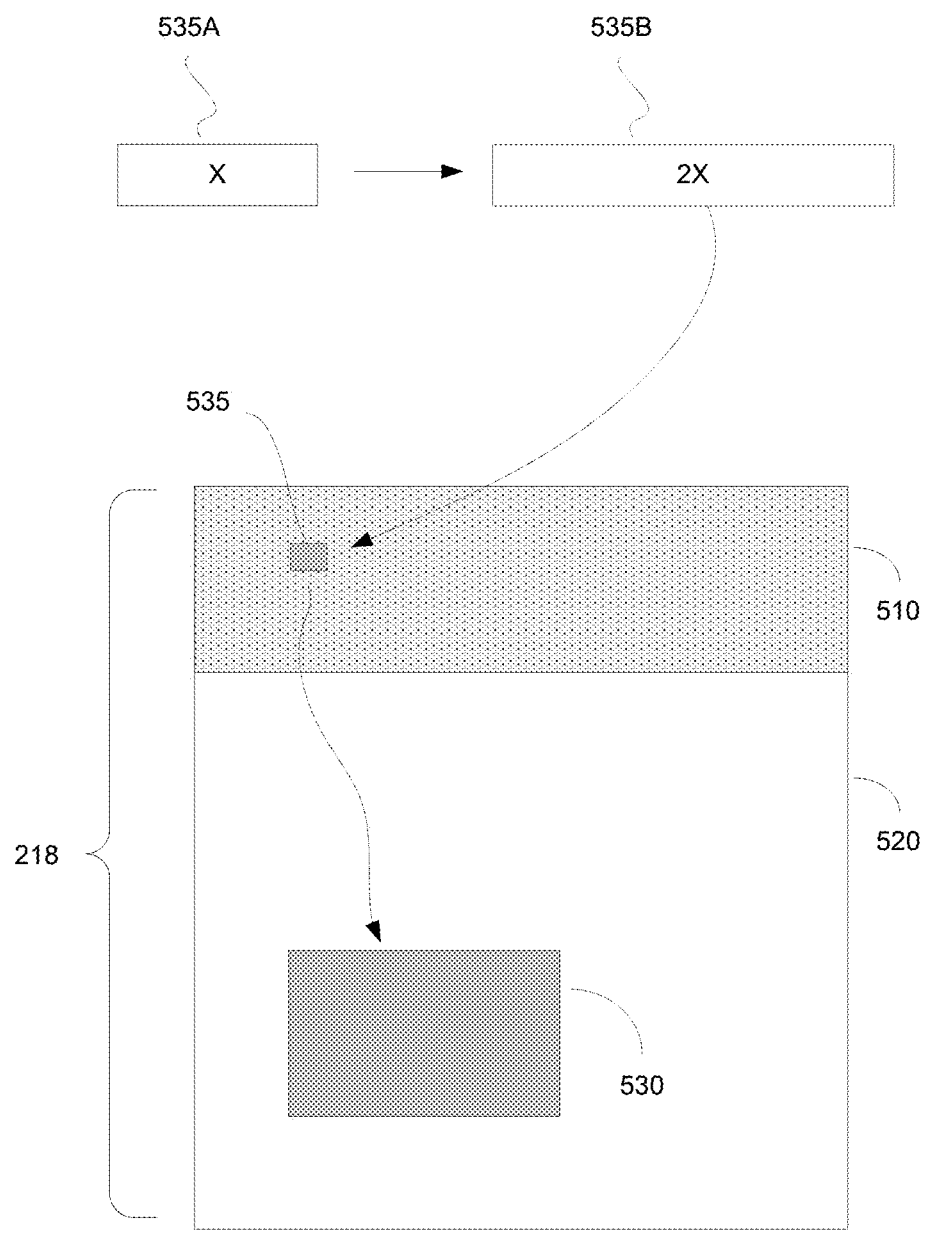
FIG. 5 illustrates a format change to the size of data objects that are stored in NVM of a memory controller of a data storage system, in accordance with one embodiment of the present disclosure.

FIG. 5 illustrates a format change to the size of data objects (e.g., including metadata objects) that are stored in NVRAM 218 of a memory controller (e.g., active controller 220 and/or standby controller 224) of a data storage system, in accordance with one embodiment of the present disclosure. As shown, NVRAM 218 includes a first partition 510 that is dedicated for storing metadata objects. NVRAM 218 also includes a second partition 520 that is dedicated for storing data objects. In one implementation, a data object corresponds to and/or is aligned with a corresponding metadata object, in a one-to-one relationship. For example, metadata object 535 corresponds to data object 530. When upgrading, data objects are upgraded and/or mirrored between NVMs, wherein data objects generally may include metadata objects. In other implementations, more than one data object may correspond to a data object. In still other implementations, one or more data objects may correspond to one or more data objects.

Metadata object 535 includes information related to data object 530. For example, the information may include location information for accessing data object 530, a pointer to the entry in NVRAM 218 for accessing data object 530, the size of data object 530, indexing and/or permissions for purposes of implementing file system access, information related to replication, and other relevant information.

The NVRAM format may define the size of the partitions 510 and/or 520, size or sizes of data objects, size or sizes of metadata objects. For purposes of illustration, the NVRAM format may define a specific size for each metadata object, and wherein an initial size of the metadata object 535 is "X," shown in metadata object 535A. The metadata object 535A was originally stored in the first partition 510 before reformatting was performed.

In an example illustrating a use case for NVRAM formatting, it may be necessary to reformat the first partition 510 of NVRAM 218 when upgrading the active controller 220, such that the same NVRAM 218 supports the old controller and the new controller (upgraded). In the example, the NVRAM reformatting may change the initial format that defines a metadata object of X bytes, to a second format that defines a metadata object having twice the number of bytes. As such, the new format allows for larger metadata objects that can be handled by the upgraded controller, such as metadata object 535B of size 2x. For instance, a metadata object 535A in the initial format is 40 bytes in length, whereas the metadata object 535B under the upgraded format has a size of 80 bytes and is stored in the reformatted first partition 510.

As shown in FIG. 5, the first partition 510 after reformatting is shown with a dotted pattern, and can be distinguished from a first partition in its initial format (e.g., a clear box). This distinction between NVRAM in its initial state (clear box) and NVRAM that has been reformatted (e.g., dotted box) is continued in the description of FIGS. 7A-J.

Figure 6A:
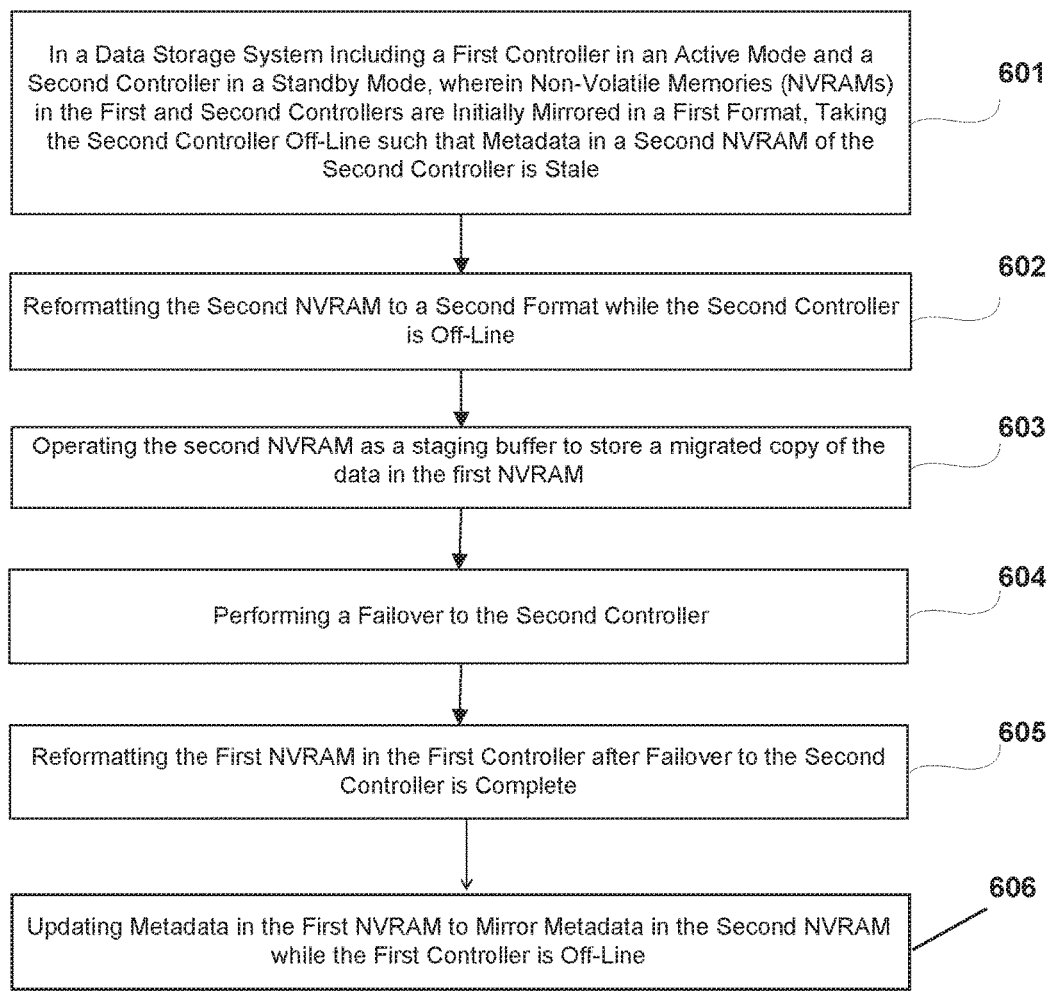
FIG. 6A is a flow chart implementing a method for upgrading NVM of memory controllers supporting a networked data storage system, in accordance with one embodiment of the present disclosure.

FIG. 6A is a flow chart implementing a method for upgrading NVRAM of memory controllers supporting a networked data storage system without any substantial or noticeable downtime when the data storage system is servicing IO requests from one or more hosts, in accordance with one embodiment of the present disclosure. The method disclosed in FIG. 6A can be implemented by the storage array 102 of FIGS. 1-3 in embodiments of the present disclosure.

An upgrade to NVRAM of memory controllers is required under various scenarios. For example, a controller upgrade may increase or grow the size (logical and/or physical) of NVRAM, impose a change to NVRAM layout (e.g., adding a header), changing the size of the partition holding metadata, adding features (e.g., update entry) to the controller, all of which require a format change to NVRAM. In one implementation, a format upgrade is performed when the size of available space in the NVRAM is increased, though the physical space may remain unchanged (e.g., increasing available space from 4 GB (gigabytes) to 8 GB in an NVRAM of size 8 GB). In addition, a format change may be triggered when controllers of a data storage system detect that the partition used for storing metadata in NVRAM is smaller than that allocated. These NVRAM format upgrades may be triggered through controller software version updates, maintenance releases, patch releases, customer service requests (e.g., increase in speed), etc.

The process disclosed in FIG. 6A is performed on a data storage system including a first memory controller operating in an active mode and a second memory controller operating in a standby mode. The memory controllers are configured to access data stored in various locations depending on availability, to include NVRAM of the memory controllers, an SSD read cache, and/or HDD memory, as previously described in relation to FIGS. 1-4. NVRAMs in the first and second controllers are initially mirrored in a first format. In one implementation, the software and/or software versions managing controller operations for each of the controllers are identical and/or compatible. Each NVRAM includes data objects and corresponding metadata objects, such as in a one-to-one relationship, in one embodiment. Depending on the format that is implemented for the NVRAM, a size definition may be associated with individual objects of metadata and data. The first and second memory controllers work cooperatively to reformat the NVRAMs to a second format without compromising data integrity and while fully servicing IO requests from one or more hosts. In one implementation, the controller that is servicing IOs during the reformatting process controls the actions performed on components of one or both controllers directly or with the help of the other controller. The process described in FIG. 6A may be generalized to upgrading and/or mirroring data stored in NVMs of a data storage system, wherein the data includes metadata.

At operation 601, the method includes taking the second controller off-line, such that metadata in a second NVRAM of the second controller is stale. In one implementation, a mirroring process conducted between the two controllers is terminated, thereby effectively taking the second controller off-line. The second controller is now considered being in a stale state, and more specifically, the metadata data in the second NVRAM of the second controller is no longer being updated (e.g., mirrored) to match the state of data in the first NVRAM of the first controller. While the second controller is off-line, the first controller is configured in the active mode, and services IOs from the one or more hosts in isolation.

At operation 602, the method includes reformatting the second NVRAM to a second format. The data storage system is able to continue to handle IOs from the one or more hosts while the second NVRAM is being reformatted, since the first controller is configured in the active mode. The reformatting process is performed while the second controller is off-line. In that manner, the reformatting of the second NVRAM is conducted efficiently without having to ensure that data and metadata objects are continually updated in the second NVRAM. In one embodiment, the contents of the second NVRAM are fully flushed in preparation of the storing of data.

At operation, 603, the method includes operating the second NVRAM as a staging buffer to store a migrated copy of the data in the first NVRAM. This is performed while the state of data in the first NVRAM is paused. For example, in one embodiment, the first controller is blocked from handling IO requests from the one or more hosts. Because the state of data does not change while IO handling is paused, the data integrity of the data storage system is maintained during the reformatting of both the first and second NVRAMs. In this process, NVRAM to NVRAM migration results in less error handling because it is less complex to maintain the copied data on NVRAM, as opposed to migrating data to another system (e.g., disk storage). In that manner, there is less controller outage leading to a failed reformatting process when using the NVRAM as a staging buffer.

At operation 604, the method includes performing a failover to the second controller. Because data stored in the first and second NVRAMs is mirrored, the second controller is available to begin operating in a standby mode once the block on the first controller from handling IOs is released. An induced failover operation configures the second controller in the active mode to service IOs from one or more hosts in isolation, while the first controller is taken off-line.

At operation 605, the method includes reformatting the first NVRAM in the first controller after failover to the second controller is complete. The data storage system is able to continue handle IOs from the one or more hosts while the first NVRAM is being reformatted, since the second controller is configured in the active mode, though acting in isolation. The reformatting process is performed while the first controller is off-line. In that manner, the reformatting of the first NVRAM is conducted efficiently without having to ensure that data and metadata objects are continually updated in the first NVRAM. In one embodiment, the contents of the first NVRAM are fully flushed in preparation of the storing of data.

At operation 606, the method includes updating metadata in the first NVRAM to mirror metadata in the second NVRAM while the first controller is off-line. In particular, a mirroring and catch-up process is performed such that the data stored and their states between the two NVRAMs match. Once the two states of data between the two NVRAMs of the first and second controller match, the data storage system is again ready to be configured in an active/standby mode to ensure controller redundancy when servicing IOs from the one or more hosts.

Figure 6B:
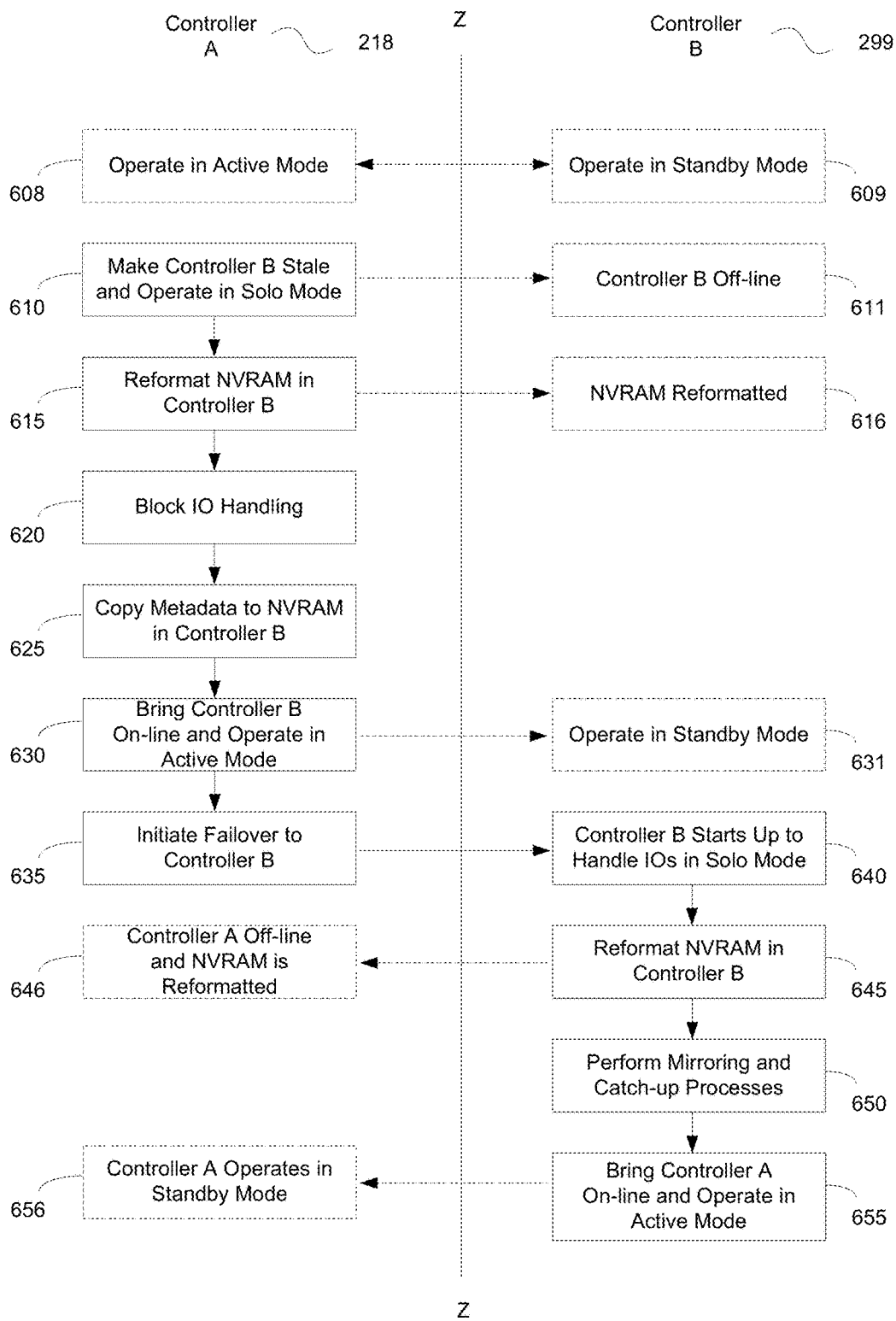
FIG. 6B is a flowchart implementing a method for scheduling on-line and off-line modes for memory controllers supporting a networked data storage when upgrading NVM of the controllers, in accordance with one embodiment of the present disclosure.

In combination FIGS. 6B and 7A-7J illustrate the implementation of a framework for performing a hot NVRAM format upgrade. In particular, FIG. 6B is a flow diagram disclosing a method for taking memory controllers supporting a networked data storage system on-line and off-line when upgrading NVRAM of the controllers without any substantial or noticeable downtime when the data storage system is servicing IO requests from one or more hosts, in accordance with one embodiment of the present disclosure. FIG. 6B provides more detailed operations than disclosed in FIG. 6A, and more specifically discloses how and when a failover is performed during the sequence of bringing the first and second controllers off-line and on-line. The process described in FIG. 6B may be generalized to upgrading and/or mirroring data stored in NVMs of a data storage system, wherein the data includes metadata. FIGS. 7A-J illustrate the operations of FIG. 6B performed on first and second memory controllers supporting a networked data storage system during a process for reformatting the NVRAMs, in accordance with one embodiment of the present disclosure. The method disclosed in FIG. 6B can be implemented by the storage array 102 of FIGS. 1-3 in embodiments of the present disclosure. The operations of flow diagram of FIG. 6B will be further described with reference to FIGS. 7A-J below.

As previously described, an upgrade to NVRAM of memory controllers is required under various scenarios, such as growing NVRAM, changing NVRAM layout, changing the partition in NVRAM, adding features, etc. These NVRAM format upgrades may be triggered through controller software version updates, maintenance releases, patch releases, customer service requests (e.g., increase in speed), etc.

Updating the format of NVRAM in memory controllers is performed on a data storage system including a first memory controller (controller A of FIGS. 6-7) and a second memory controller (controller B of FIGS. 6-7). The memory controllers A and B (e.g., corresponding NVRAM reformatting managers 112) work cooperatively to perform the reformatting of NVRAMs 218 and 299. In one implementation, the controller that is actively servicing IOs during the reformatting process acts as the master and controls the actions performed on components of one or both controllers, either directly or through the other controller. In that manner, at various points during the reformatting process controller A may be the master, and at other points controller B is the master. Operations being handled by a particular controller are shown in FIG. 6B under its heading, such that operations handled by controller A are to the left of line Z-Z, and operations handled by controller B are to the right of line Z-Z.

Figure 7A:
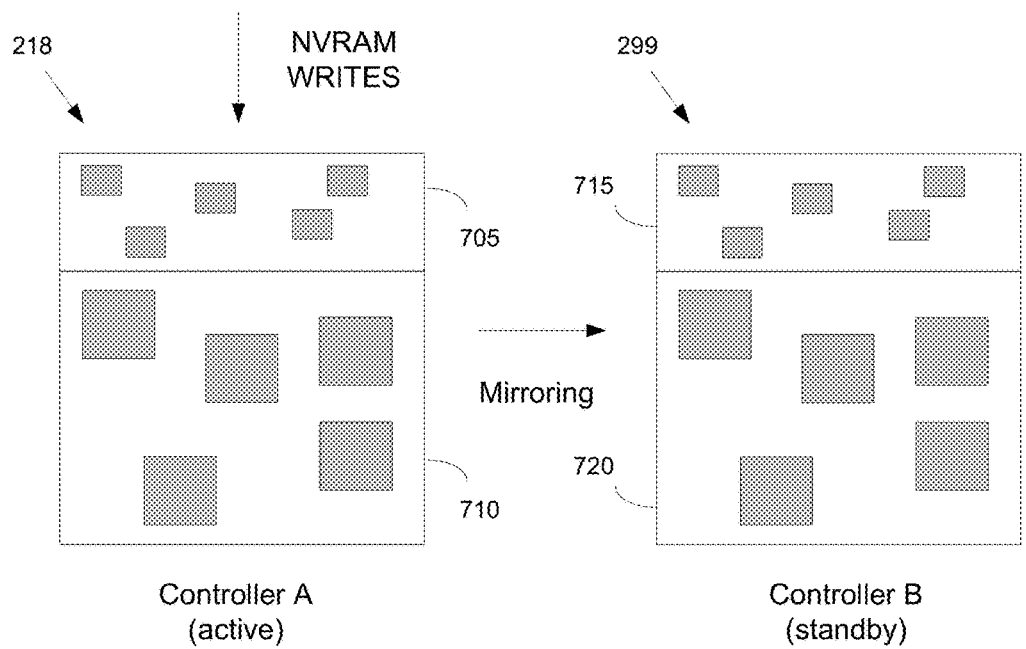
FIGS. 7A-J illustrate the states and/or operational modes of NVMs of memory controllers supporting a networked data storage system during a process for reformatting the NVMs without any substantial or noticeable downtime in the data storage system, in accordance with one embodiment of the present disclosure.

For illustration, controller A is active controller 220 and controller B is standby controller 224 of FIG. 2. In an initial state of a data storage system configured in an active/standby model, controller A is operating in active mode as indicated by block 608, and controller B is operating in standby mode as indicated by block 609. That is and as shown in FIG. 7A, controller A is actively servicing IO requests (e.g., NVRAM writes), controls/owns all data structures, and provides data services, such as compression, snapshots, replication, redundant array of independent disks (RAID) storage, etc. Controller B is ready to take over the services performed by controller A should there be a failure (either real or induced). In one implementation, controllers A and B are configured similarly, such as being of the same model, running the same software version, etc.

As shown in FIG. 7A, each controller includes a corresponding NVRAM, wherein controller A includes a first NVRAM 218 and the controller B includes a second NVRAM 299. Further, the first NVRAM 218 includes a first partition 705 that is configured for storing metadata objects, and a second partition 710 for storing data objects. Also, the second NVRAM 299 includes a first partition 715 that is configured for storing metadata objects, and a second partition 720 for storing data objects. Depending on the format that is implemented for the NVRAM 218 and 299, a size definition may be associated with individual objects of metadata and data. As such, both of NVRAMs 218 and 299 are initially operating using a first format that will be upgraded after reformatting. For illustration, the first format may define a metadata object size of 40 bytes.

Because the data storage system is configured as an active/standby model, the NVRAMs in the two controllers are mirroring each other. That is, as the NVRAM 218 of controller A is being updated with IO requests, any operation and/or change to NVRAM 218 is also performed on NVRAM 299 of controller B. In particular, controller A and controller B work cooperatively to mirror content between NVRAMs 218 and 299. For illustration, as shown in FIG. 7A, the states of objects stored in NVRAM 218 and NVRAM 299 are identical. For instance, there are 5 metadata objects stored in the first partition 705 of NVRAM 218, and there are 5 metadata objects stored in the first partition 715 of NVRAM 299, wherein the data objects are distributed with the same pattern and/or number in both NVRAMs 218 and 299 to show they are mirrored and have the same state. Further, the data objects stored in the second partition 710 of NVRAM 218 and the second partition 720 of NVRAM 299 are stored with the same pattern and/or number to show they are also mirrored and have the same state.

Figure 7B:
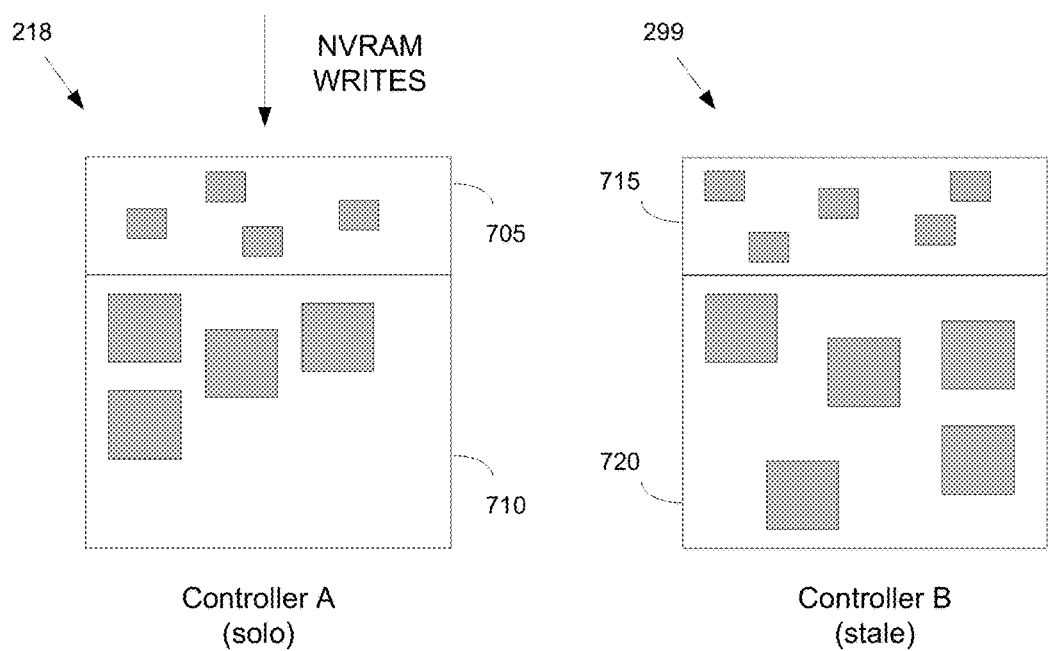

In operation 610, the second controller B is taken off-line, as shown in block 611. That is, the mirroring process between controller A and controller B is broken or terminated. For example, the mirroring process may be terminated by breaking a connection between the first and second controller, wherein the connection is used for mirroring. In that case, controller B is considered as being in a stale state, such that metadata in the second NVRAM 299 of controller B is stale. For example, as shown in FIG. 7B, controller A continues to service IO requests (e.g., NVRAM writes) coming from one or more hosts. However, since controller B is off-line, controller A is acting in isolation, or in solo mode. For instance, the data states for the NVRAM 218 between FIGS. 7A and 7B have changed. In particular, because controller A is continually servicing IOs, the metadata objects stored in first partition 705 in FIG. 7A have a different pattern and/or number than the metadata objects stored in first partition 705 in FIG. 7B.

On the other hand, because controller B is taken off-line, the state of objects stored in NVRAM 299 will not change between FIG. 7A and FIG. 7B, because mirroring is not being performed. As such, NVRAM 299 of controller B can be reformatted, while controller A actively services IOs from one or more hosts. In particular, the metadata objects stored in the first partition 715 of FIG. 7A and the metadata objects stored in the first partition 715 of FIG. 7B are distributed with the same pattern and/or number to show that the NVRAM 299 is now stale. After reformatting, NVRAM 299 can act as a staging buffer during the reformatting process, as further described below.

In one embodiment, a failover operation between the two controllers A and B is disengaged. In particular, failover to the controller B is blocked while controller B is off-line, and while controller A acts in isolation to service IOs.

Figure 7C:
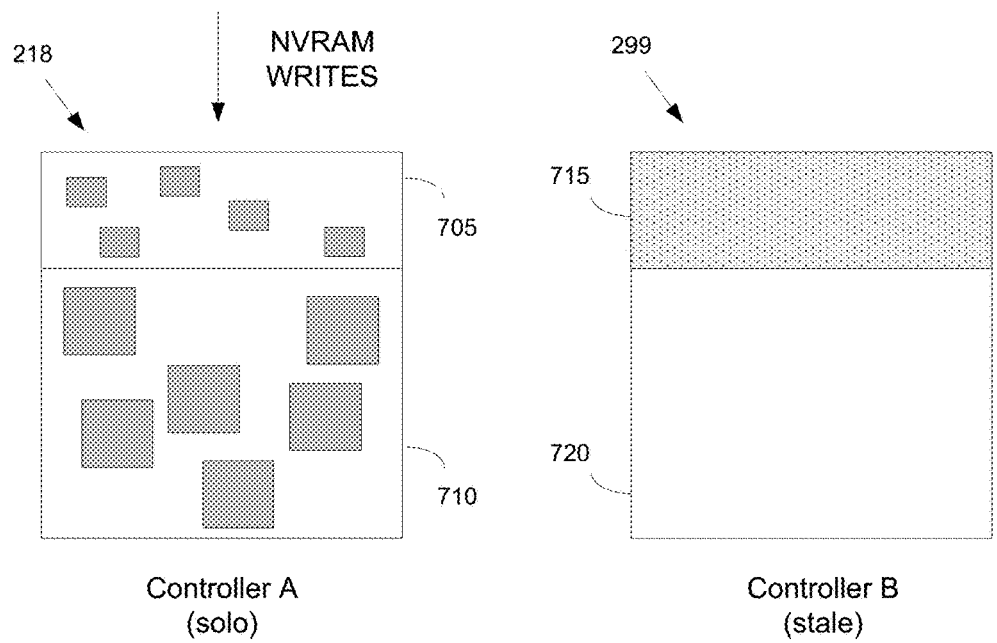

At operation 615, the second NVRAM 299 in the second controller B is reformatted (illustrated in block 616) to a second format while the second controller is off-line. For example, the second format may define a larger size (e.g., 80 bytes) for metadata objects stored in the first partition 715. As such, after upgrading, the first partition 715 is configured to handle a metadata object that is twice the size than in the first format. FIG. 7C illustrates that the first partition 715 now shown with a dotted pattern in the background of NVRAM 299 is now configured in the second format. Generally, as previously described a partition after reformatting is shown with a dotted pattern, and can be distinguished from a partition in the first or initial format that is shown with a clear pattern, such as in the box. During reformatting, partition 715 of controller B may be flushed (e.g., erased). As shown in FIG. 7C, no metadata objects populate the first partition 715. Further, the second partition may also be flushed during reformatting.

Further, while reformatting of NVRAM 299 is being performed, controller A continues to service IO requests. For illustration, the metadata objects stored in first partition 705 of controller A in FIG. 7B have a different pattern and/or number than the metadata objects stored in first partition 705 shown in FIG. 7C. In addition, the data objects stored in the second partition 710 of controller A in FIG. 7B have a different pattern and/or number than the data objects stored in second partition 710 shown in FIG. 7C.

Figure 7D:
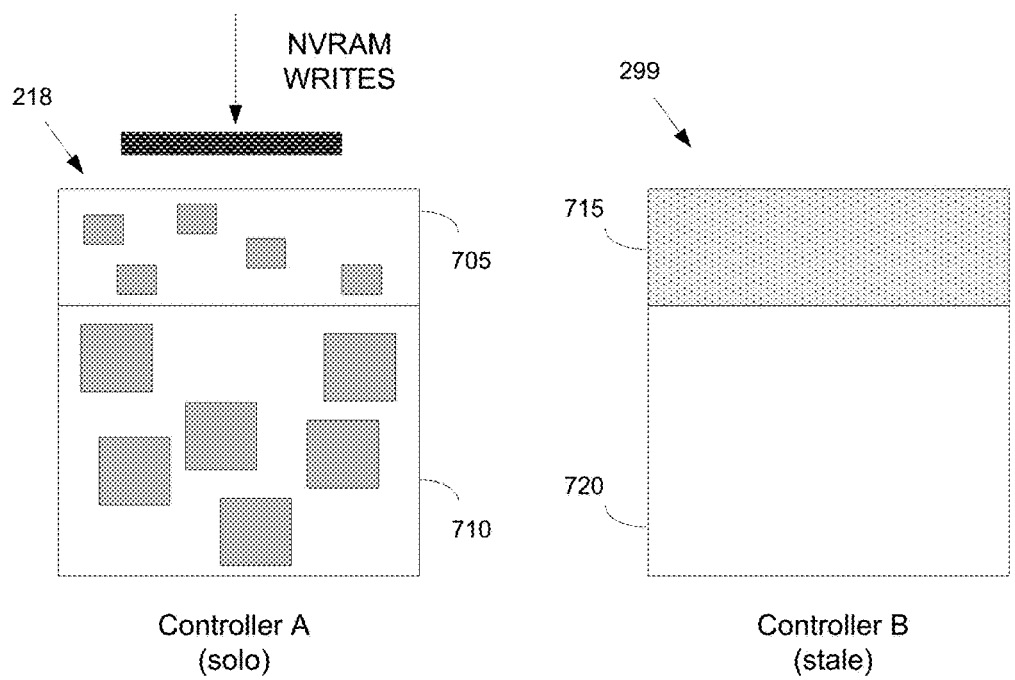

At operation 620, the handling of IOs is blocked at the first controller A after reformatting of the second NVRAM 299 is complete. As shown in FIG. 7D, controller A is now blocked from handling IO requests from one or more hosts. For example, writes to NVRAM 218 are blocked. In that manner, the state of data stored in NVRAM 218 remains unchanged after controller A is blocked from handling IOs. That is, the state of data in NVRAM 218 remains unchanged while controller A is blocked from handling IO requests. For instance, the metadata and data objects stored in the first partition 705 and the second partition 710 of controller A have the same pattern and/or number in FIGS. 7C-D, wherein FIG. 7D illustrates the point at which handling of IOs are blocked. Further, as will be described below, the state of NVRAM 218 of controller A remains unchanged throughout FIGS. 7C-F, through which controllers A and B are configured to operate in one or more active and standby modes.

Figure 7E:
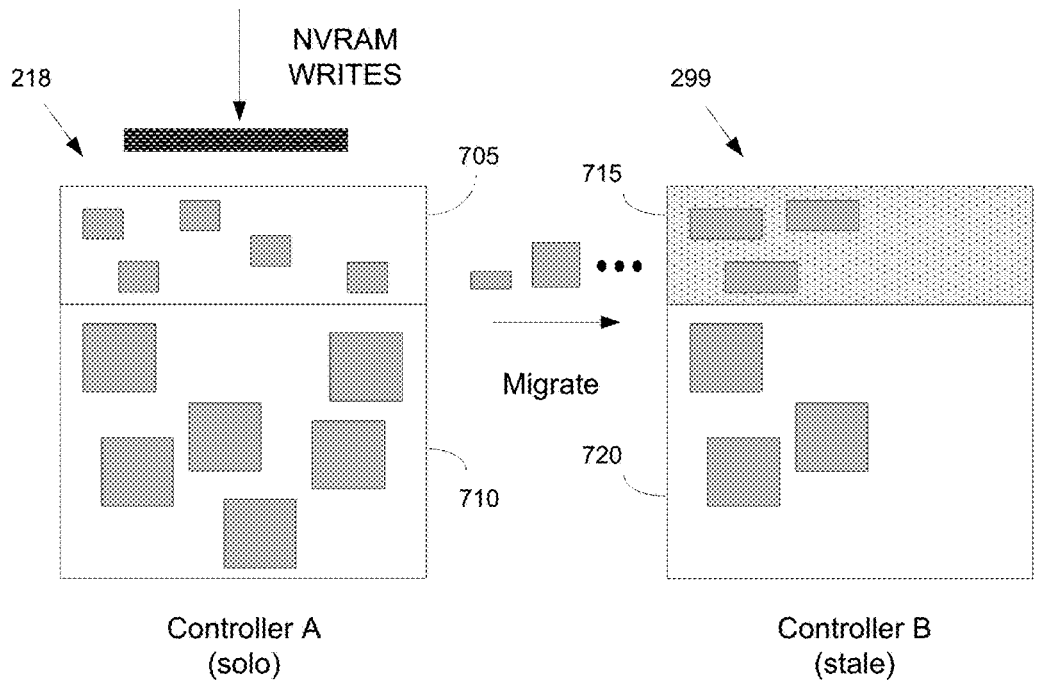

In particular, at operation 625, while controller A is blocked from handling IOs, metadata stored in the first NVRAM 218 (e.g., from partition 705) is migrated to the second NVRAM 299 of the second controller B. For instance, metadata stored in the first partition 705 in NVRAM 218 is migrated to the first partition 715 in NVRAM 299, as is shown in FIG. 7E. in that manner, NVRAM 299 acts as a staging buffer for storing metadata and/or data in their proper states during the reformatting process and/or while handling IO requests from one or more hosts. In one implementation, metadata stored in first partition 705 of NVRAM 218 is copied to first partition 715 of NVRAM 299, and data stored in second partition 710 is copied to second partition 720. FIG. 7E shows a midpoint of the migration process, wherein the NVRAM 299 does not fully mirror NVRAM 218.

In one embodiment, mapping is performed between the NVRAM 218 configured in the first format and the NVRAM 299 configured in the second format. Because the formatting has changed, the size and location of metadata and/or data maybe different between the two NVRAMs 218 and 299, even though the information stored is identical. As such, a mapping process between the two controllers A and B may be performed, such as through the mapping modules 137 of both controllers. In another embodiment, pools of metadata and/or data stored in NVRAM 218 is copied to the corresponding location of the NVRAM 299 that is configured in the new, second format to handle larger sizes of metadata and/or data.

In one embodiment, operations 620 and 625, including the blocking of handling of IOs by controller A and migrating metadata stored in the first NVRAM 218 to the second NVRAM 299, are performed over a period that is less than a fault threshold. The fault threshold is defined for a first host making access requests to the data storage system. Because the handling of IOs is blocked at controller A which is tasked for servicing IO requests from the one or more hosts, a particular IO may be returned to a requesting host in the form of an error or handling error (e.g., iSCSI driver error, host bus adapter (HBA) driver error, etc.). The requesting host may choose to resend the IO back to the data storage system, and more particularly back to controller A. As long as controller A is blocked from handling IOs, error messages will be generated and returned to the host. A fault is triggered by the host when a timeout period or fault threshold is exceeded in association with the handling of an IO by controller A of the data storage system. For example, an IO request that has not been handled by the data storage system within the timeout period or fault threshold will trigger a fault in the data storage system as identified by the requesting host. The fault indicates that the data storage system is failing to service IOs. For example, the timeout period or fault threshold may be associated with an internet small computer systems interface (iSCSI), SCSI driver timeout, or host bus adaptor (HBA) driver timeout. For purposes of illustration, the pausing of IO requests being handled by controller A may occur over a period of 1-2 seconds while objects in NVRAM 218 of controller A are migrated to NVRAM 299 of controller B. As such, the period over which IO handling is paused is less than an iSCSI or HBA driver timeout or fault threshold of say 30 seconds. In some embodiments, the threshold may be less than 2 minutes. The threshold may be longer than 2 minutes, but this may be controlled based on when a host will discern the delay as indicative of the storage array being down. Generally, this threshold should be less than a time that a host may programmatically assume that the array is down or non-operational. In that manner, the hosts will experience no appreciable and/or detectable interruption in service while undergoing a hot NVRAM format upgrade.

Figure 7F:
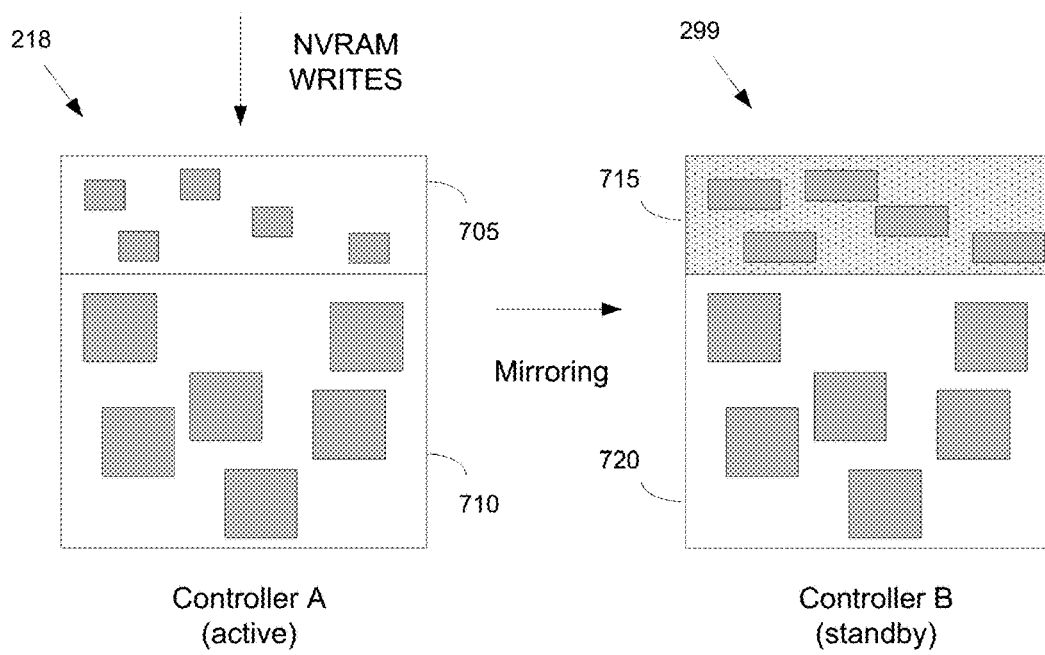

At operation 630, the second controller B is brought back on-line in a standby mode, as is shown in block 631. That is, the data storage system is again operating in an active/standby configuration. Again, because the handling of IOs by controller A is paused or blocked for a period that does not exceed a fault threshold, no faults are triggered, and effectively service of IOs to one or more hosts remains uninterrupted. In particular, controller A is operating in an active mode, and controller B is operating in a standby mode, as is shown in FIG. 7F. As such, mirroring is again performed between controllers A and B, such that the metadata stored in first partition 705 and data stored in second partition 710 of NVRAM 218 is mirrored in first partitions 715 and 720 of NVRAM 299. In addition, the state of the data at this point when controller B is brought on-line is identical to the state of data when NVRAM 299 of controller B is being reformatted and data is migrated. That is, the metadata and data objects stored in the NVRAM 218 of FIG. 7E and the metadata and data objects stored in NVRAM 218 of FIG. 7F (when controller B is brought on-line) have an identical pattern and/or number.

Mapping may be performed for metadata between the first partition 705 of NVRAM 218 of the first format and the first partition 710 of NVRAM 299 of the second format because of the different formatting (e.g., different sizes of metadata objects). As shown in FIG. 7F, to show the mirroring process is complete, the pattern and/or number of metadata objects is similarly configured between NVRAMs 218 and 299 (but for the size difference) to show that the states between the NVRAMs 218 and 299 for the storing of metadata is identical. Further, as shown in FIG. 7F, the pattern and/or number of data objects is identical between NVRAM 218 and 299 since the size of the data objects remain unchanged, in one implementation, and for purposes of illustration.

Figure 7G:
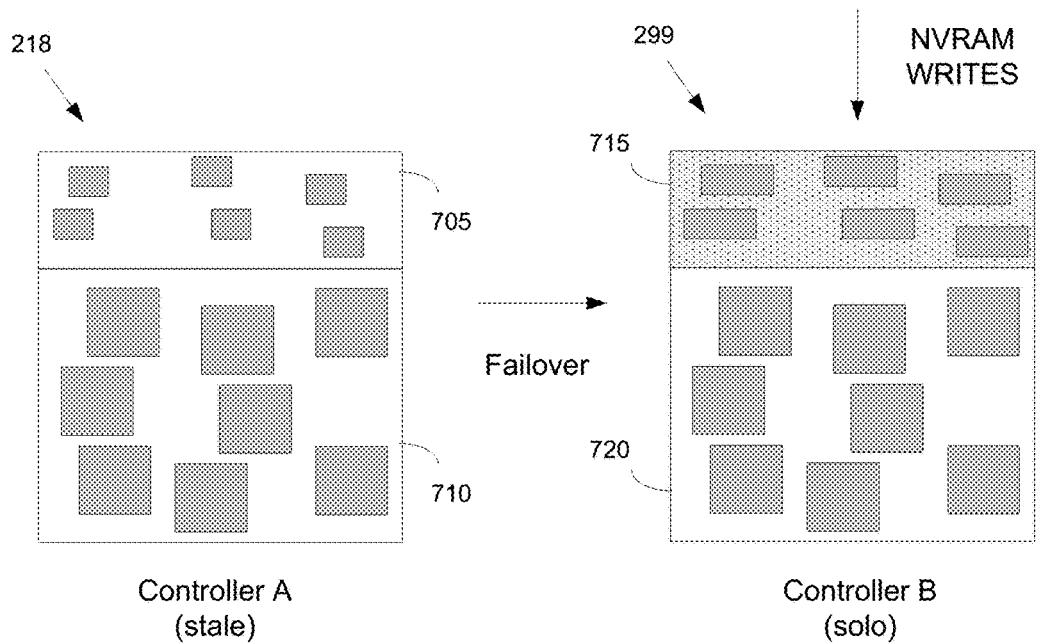

At operation 635, the first controller A is taken off-line by performing a failover to the second controller B. Failover is performed after the second controller is back on-line and configured to operate in the standby mode as both NVRAMs 218 and 299 are mirrored. As shown in FIG. 7G, the state of data has changed between FIGS. 7F and 7G (while controllers A and B are in an active/standby configuration up to failover) because controller A actively services IOs before failover is induced. As such, the pattern and/or number of metadata and data objects is different between the NVRAM 218 of FIG. 7F (and as mirrored to NVRAM 299) and the NVRAM 218 of FIG. 7G (and as mirrored to NVRAM 299).

As such, after successful failover, controller B is actively handling IO requests (e.g., writes to NVRAM) from the one or more hosts. In that manner, after failover is performed in operation 640 controller B starts up and operates in isolation. Furthermore, failover back to controller A is blocked. At this point, controller A is off-line and stale, such that metadata in the first NVRAM 218 of controller A is now stale from this point further. That is, mirroring is not being performed from controller B back to controller A (e.g., to mirror NVRAM data states), since during the failover process controller A has been taken off-line.

Figure 7H:
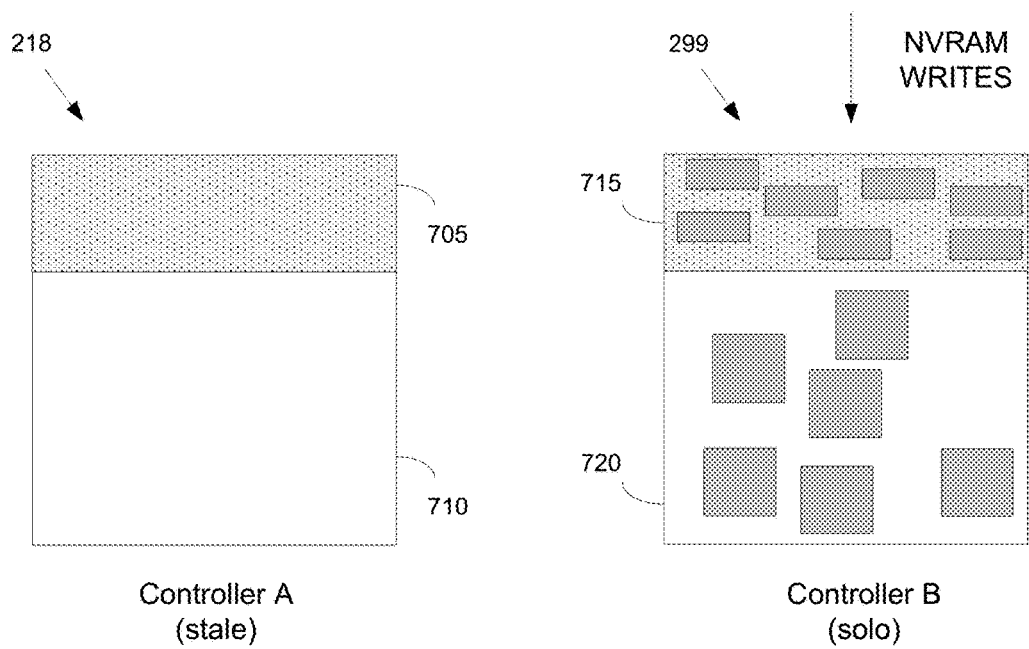
Figure 7I:
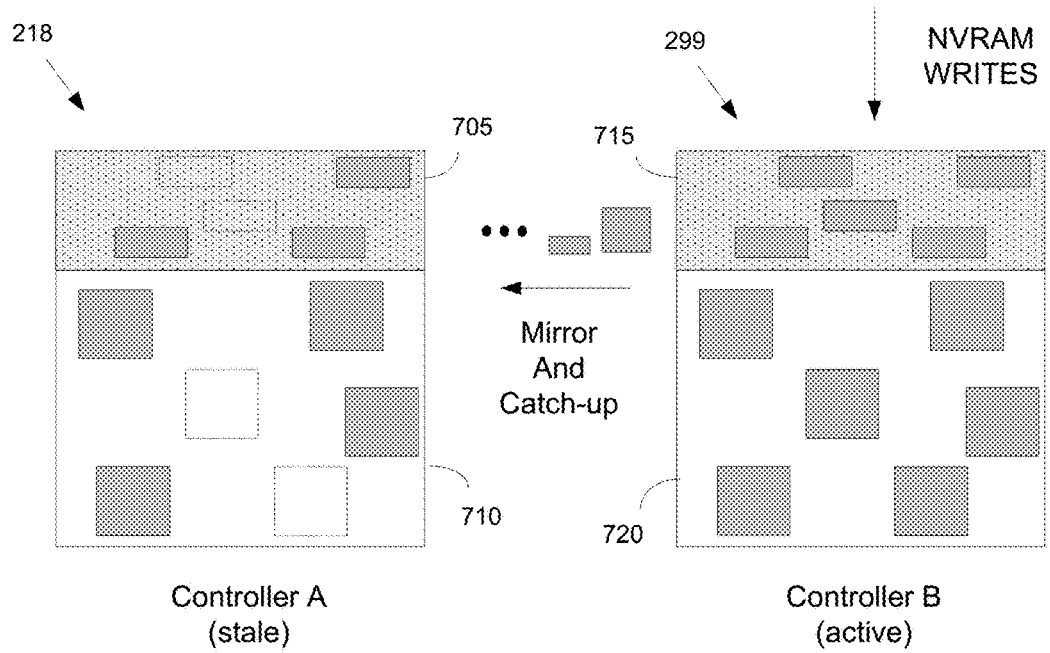

At operation 645, the first NVRAM 218 in the first controller A is reformatted to the second format (e.g., metadata object size is defined as 80 bytes). Reformatting is performed after failover to controller B is complete, and while controller A is off-line, as is shown in block 646. As shown in FIG. 7H, the first partition 705 is shown with a dotted pattern to indicate a configuration in the second format. In addition, a flushing of NVRAM 218 may be performed.

During the reformatting of NVRAM 218, controller B continues to handle IOs. As such, the pattern and/or number of metadata and data objects are different between the NVRAM 299 of FIG. 7G and NVRAM 299 of FIG. 7H.

At operation 650, metadata in the first NVRAM 218 in the first controller A is updated to mirror metadata stored in the second NVRAM 299 of the second controller B, while controller A is off-line. A migration process is not performed at this stage because the state of data stored in NVRAM 299 is continually changing, as controller B continues to service IOs. For example, the pattern and/or number of metadata and data objects are different between the NVRAM 299 of FIGS. 7H and 7I to show that controller B is continually modifying the state of data in NVRAM 299 when servicing IOs (e.g., NVRAM writes). As such, a mirroring and/or catch up process is performed until the states of data between NVRAM 299 of active controller B and NVRAM 218 of off-line controller A are identical. In one implementation, the mirroring and/or catch up process includes enabling mirroring between controllers A and B after NVRAM 218 of controller A has been reformatted, and catching up a first state of data stored in the first NVRAM 218 of the second format with a second state of data stored in the second NVRAM 299 of controller B, also configured in the second format.

Figure 7J:
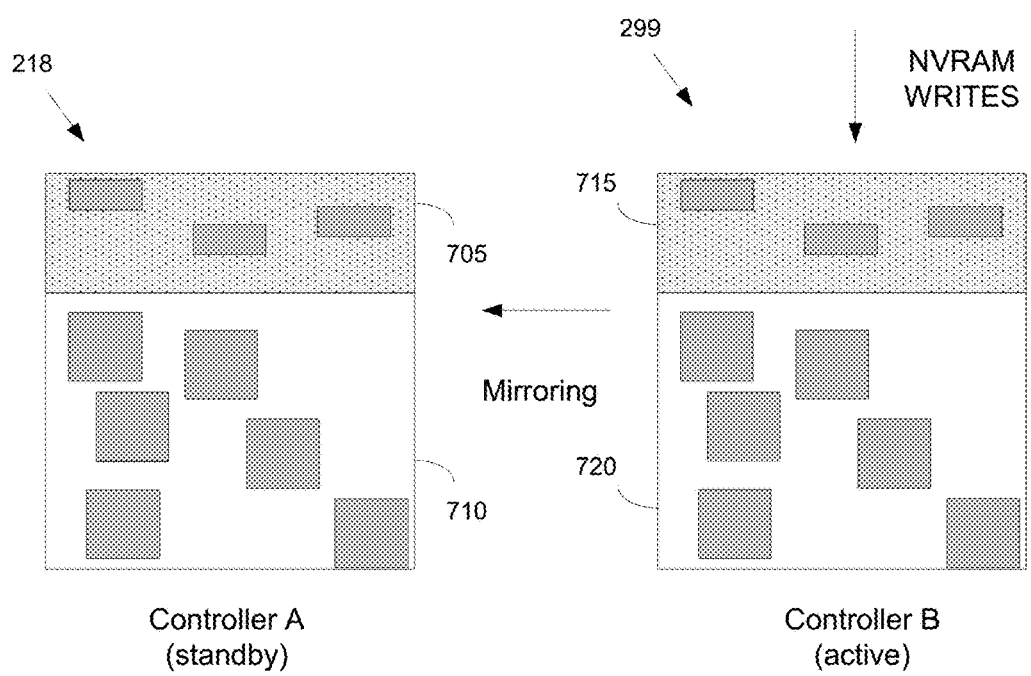

At operation 655, after the states of data between NVRAMs 299 and 218 match, the first controller A is brought back on-line. Furthermore, controller A is configured to operate in standby mode, such that the data storage system is in an active/standby configuration. As such, controller B is operating in an active mode, and controller A is operating in a standby mode as indicated in block 656. For example, FIG. 7J illustrates that controller B is actively servicing IOs (e.g., NVRAM writes). This is shown further since the pattern and/or number of metadata and data objects are different between the NVRAM 299 of FIG. 7I and the NVRAM 299 of FIG. 7J.

Additionally, in the active/standby configuration for the data storage system, mirroring is occurring between NVRAM 299 and NVRAM 218. Because NVRAMs 218 and 299 are similarly formatted, no mapping is necessary during the mirroring process. As shown in FIG. 7J, the pattern and/or number of metadata and data objects are identical between the NVRAM 299 of controller B (active) and NVRAM 218 of controller A (standby).

As a result, in the framework described in FIGS. 6B and 7A-J, both NVRAMs 218 and 299 of controllers A and B have been reformatted during a hot upgrade without taking down data storage system.

In one embodiment, there may be cases where room in the NVRAM being reformatted is reserved before reformatting is performed. For example, when increasing the upgrade entry or page size, space in the NVRAM is reserved; otherwise space may not be available to complete the NVRAM reformatting process. In one implementation, operations are performed to reserve space in the NVRAM before upgrading, including marking the reserved space in the pools located in the NVRAM as being un-allocatable; forcing a mirroring checkpoint; determining when the checkpoint is complete and the marked or reserved space is freed; and then starting the hot NVRAM format upgrade process.

Figure 8:
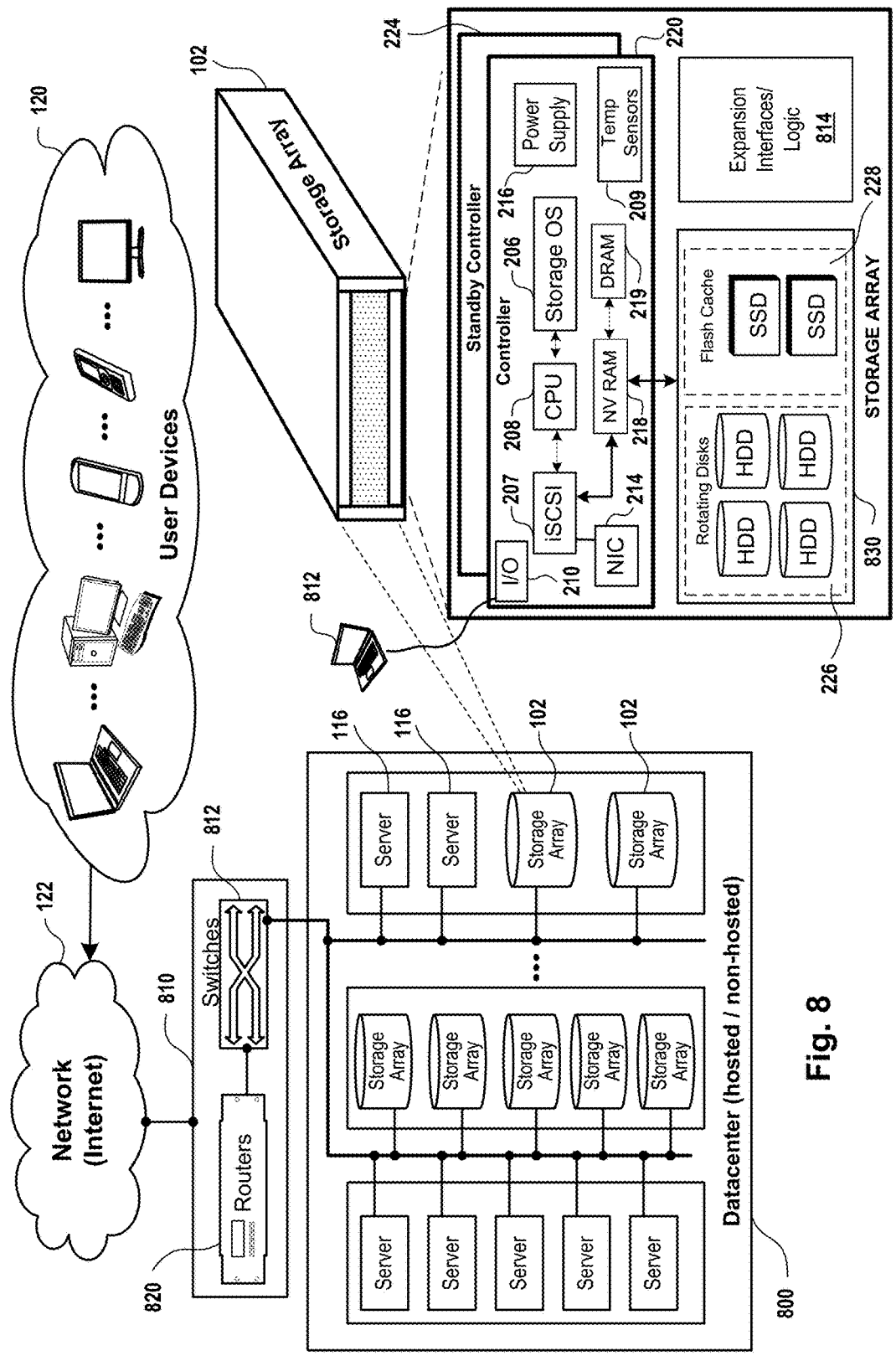
FIG. 8 illustrates a diagram of system components that may utilize a plurality of storage arrays, in data center configurations or non-data center configurations, in accordance with one embodiment.

FIG. 8 illustrates a diagram of system components that may utilize a plurality of storage arrays, in data center configurations or non-data center configurations, in accordance with one embodiment. As shown, data center 800 may include a plurality of servers 116, a plurality of storage arrays 102, and combinations of servers and storage. It should be understood that the exact configuration of the types of servers and storage arrays incorporated into specific implementations, enterprises, data centers, small office environments, business environments, and personal environments, will vary depending on the performance and storage needs of the configuration. Thus, in the data center example, data center 800 is shown connected to networking equipment 810.

The networking equipment 810 may be incorporated into networking shelves or structures of a data center or install point. For simplicity, switches 822 and routers 820 are provided, to illustrate the conductivity of data center 800 to the network 122. In one embodiment, each storage array 102 and the servers 116 will communicate with respective switches and routers to have independent connectivity to the network 122. Thus, the bus illustration of FIG. 8 is simply utilized to provide an example of communication of various components to various switches and routers and the network 122. User devices 120 are shown as example computing devices that can access applications, data, infrastructure, and communications associated with data centers and/or specific storage arrays.

In some embodiments, servers may be virtualized utilizing virtualization techniques, such that operating systems can be mounted on hypervisors to allow hardware and other resources to be shared by specific applications. In virtualized environments, storage is also accessed by virtual hosts that provide services to the various applications and provide data and store data to storage. In such configurations, the storage arrays can be configured to service specific types of applications, and the storage functions can be optimized for the type of data being serviced.

For example, a variety of cloud-based applications are configured to service specific types of information. Some information requires that storage access times are sufficiently fast to service mission-critical processing, while other types of applications are designed for longer-term storage, archiving, and more infrequent accesses. As such, a storage array can be configured and programmed for optimization that allows servicing of various types of applications. In some embodiments, certain applications are assigned to respective volumes in a storage array. Each volume can then be optimized for the type of data that it will service. As described above, the storage array 102 can include one or more controllers 220, 224.

One controller serves as the active controller 220, while the other controller 224 functions as a backup controller (standby). For redundancy, if the active controller 220 were to fail, immediate transparent handoff of processing (i.e., fail-over) can be made to the standby controller 224. Each controller is therefore configured to access storage 830, which in one embodiment includes hard disk drives (HDD) 226 and solid-state drives (SSD) 228. As mentioned above, SSDs 228 are utilized as a type of flash cache, which enables efficient reading of data stored to the storage 830.

As used herein, SSDs functioning as flash cache, should be understood to operate the SSD as a cache for block level data access, providing service to read operations instead of only reading from HDDs 226. Thus, if data is present in SSDs 228, reading will occur from the SSDs instead of requiring a read to the HDDs 226, which is a slower operation. As mentioned above, the storage operating system 206 is configured with an algorithm that allows for intelligent writing of certain data to the SSDs 228 (e.g., cache-worthy data), and all data is written directly to the HDDs 226 from NVRAM 218.

The algorithm, in one embodiment, is configured to select cache-worthy data for writing to the SSDs 228, in a manner that provides in increased likelihood that a read operation will access data from SSDs 228. In some embodiments, the algorithm is referred to as a cache accelerated sequential layout (CASL) architecture, which intelligently leverages unique properties of flash and disk to provide high performance and optimal use of capacity. In one embodiment, CASL caches "hot" active data onto SSD in real time—without the need to set complex policies. This way, the storage array can instantly respond to read requests—as much as ten times faster than traditional bolt-on or tiered approaches to flash caching.

For purposes of discussion and understanding, reference is made to CASL as being an algorithm processed by the storage OS. However, it should be understood that optimizations, modifications, additions, and subtractions to versions of CASL may take place from time to time. As such, reference to CASL should be understood to represent exemplary functionality, and the functionality may change from time to time, and may be modified to include or exclude features referenced herein or incorporated by reference herein. Still further, it should be understood that the embodiments described herein are just examples, and many more examples and/or implementations may be defined by combining elements and/or omitting elements described with reference to the claimed features.

In some implementations, SSDs 228 may be referred to as flash, or flash cache, or flash-based memory cache, or flash drives, storage flash, or simply cache. Consistent with the use of these terms, in the context of storage array 102, the various implementations of SSD 228 provide block level caching to storage, as opposed to instruction level caching. As mentioned above, one functionality enabled by algorithms of the storage OS 206 is to provide storage of cache-worthy block level data to the SSDs, so that subsequent read operations are optimized (i.e., reads that are likely to hit the flash cache will be stored to SSDs 228, as a form of storage caching, to accelerate the performance of the storage array 102).

In one embodiment, it should be understood that the "block level processing" of SSDs 228, serving as storage cache, is different than "instruction level processing," which is a common function in microprocessor environments. In one example, microprocessor environments utilize main memory, and various levels of cache memory (e.g., L1, L2, etc.). Instruction level caching, is differentiated further, because instruction level caching is block-agnostic, meaning that instruction level caching is not aware of what type of application is producing or requesting the data processed by the microprocessor. Generally speaking, the microprocessor is required to treat all instruction level caching equally, without discriminating or differentiating processing of different types of applications.

In the various implementations described herein, the storage caching facilitated by SSDs 228 is implemented by algorithms exercised by the storage OS 206, which can differentiate between the types of blocks being processed for each type of application or applications. That is, block data being written to storage 830 can be associated with block data specific applications. For instance, one application may be a mail system application, while another application may be a financial database application, and yet another may be for a website-hosting application. Each application can have different storage accessing patterns and/or requirements. In accordance with several embodiments described herein, block data (e.g., associated with the specific applications) can be treated differently when processed by the algorithms executed by the storage OS 206, for efficient use of flash cache 228.

Continuing with the example of FIG. 8, that active controller 220 is shown including various components that enable efficient processing of storage block reads and writes. As mentioned above, the controller may include an input output (10) 210, which can enable one or more machines 812 to access functionality of the storage array 102. This access can provide direct access to the storage array, instead of accessing the storage array over a network. Direct access to the storage array is, in some embodiments, utilized to run diagnostics, implement settings, implement storage updates, change software configurations, and/or combinations thereof. As shown, the CPU 208 is communicating with storage OS 206.

The standby controller 224 is configured to provide redundancy, and will not be described in detail aside from noting that either all or most or some of the components of the active controller 220 can be provided by standby controller 224. Continuing with the example of the active controller 220, the CPU 208 is configured to manage various systems and provide processing power for the storage operations of the storage array 102. In one embodiment, a network interface card (NIC) 214 is provided to interface the storage array to the network 122. The NIC 214, in one embodiment is configured to access the network 122 utilizing a TCP/IP protocol (e.g., Ethernet).

In one embodiment, an iSCSI (Internet Small Computer System Interface) processing block 207 is implemented by the controllers of the storage array 102. iSCSI is used to enable or construct a storage area network (SAN). In one configuration, an iSCSI network can be deployed using existing routers 820, switches 812, network adapters, and CatX cables and connectors, using Ethernet technology. An iSCSI network is defined by clients (iSCSI initiators), which communicate SCSI commands to iSCSI targets (iSCSI storage arrays 102) through a LAN (Local Area Network), WAN (Wide Area Network), and over the Internet. Connections between initiators and targets occur over one or more TCP connections. The TCP connections carry control messages, SCSI commands, parameters, and data within iSCSI Protocol Data Units (iSCSI PDUs).

Therefore, the storage array functions as an iSCSI target, and the CPU manages the processing of the iSCSI data received from and sent out to NIC 214. As mentioned above, the storage OS 206 manages processing for writing data from NVRAM 218 to the storage 830. In one optional embodiment, the active controller 220 can include DRAM 219. The DRAM 219 provides a mirror copy of the NVRAM 218, and the DRAM 219 can be used to provide fast acknowledgments (ACKs) back to the writing application, confirming that the writing operation is complete, which reduces application wait times on writes.

In one embodiment, the above noted CASL algorithm enables collecting and/or coalescing of random writes, compressing them, and writing them sequentially to disks. This results in write operations that are as much as one hundred times faster than in traditional disk-based storage. In one embodiment, the CASL algorithm compresses data as it is written to the array with no performance impact. For example, this process takes advantage of efficient variable block compression and multicore processors of the storage array 102.

Also mentioned above is that the controllers can include their own separate power supplies 216, temperature sensors 209, and other standard operating components. The storage array 102 may also include expansion interfaces and logic 814. As will be mentioned below, a storage array can be expanded with additional HDD storage and or additional SSD storage. Still further, a storage array 102 may also be clustered with other storage arrays to scale out processing and storage capabilities.

Accordingly, embodiments of the present disclosure disclosing the hot NVRAM format upgrade without any noticeable or substantial downtime in a corresponding data storage system have been described. While specific embodiments have been provided to demonstrate the hot NVRAM format upgrade, these are described by way of example and not by way of limitation. Those skilled in the art having read the present disclosure will realize additional embodiments falling within the spirit and scope of the present disclosure.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

One or more embodiments can also be fabricated as computer readable code on a non-transitory computer readable storage medium. The non-transitory computer readable storage medium is any non-transitory data storage device that can store data, which can be thereafter be read by a computer system. Examples of the non-transitory computer readable storage medium include hard drives, network attached storage (NAS), read-only memory, random-access memory, CD-ROMs, CD-Rs, CD-RWs, magnetic tapes and other optical and non-optical data storage devices. The non-transitory computer readable storage medium can include computer readable storage medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for upgrading format in storage systems, comprising:
   in a data storage system including a first controller in an active mode and a second controller in a standby mode, wherein first and second non-volatile memories (NVMs) configured in a first format in said first and second controllers, respectively, are initially mirrored in said first format, taking said second controller off-line such that data in said second NVM of said second controller is stale;
   reformatting said second NVM to a second format while said second controller is off-line;
   operating said second NVM as a staging buffer to maintain data integrity of said data storage system, including copying content of said first NVM configured in said first format to said second NVM configured in said second format;
   performing a failover to said second controller;
   reformatting said first NVM in said first controller to said second format after failover to said second controller is complete; and
   updating data in said first NVM configured in said second format to mirror data in said second NVM configured in said second format while said first controller is off-line.

2. The method of claim 1, wherein said operating said second NVM as a staging buffer comprises:
   blocking handling of IOs at said first controller after reformatting of said second NVM is complete;
   performing the copying while said first controller is blocked from handling IOs; and
   bringing said second controller back on-line, wherein said second controller is in said standby mode.

3. The method of claim 2, wherein said migrating data comprises:
   mapping said data stored in said first NVM configured in said first format to data stored in said second NVM configured in said second format.

4. The method of claim 2, further comprising:
   performing said blocking handling of IOs and said copying data stored in said first NVM to said second NVM over a period that is less than a threshold defined for a first host making access requests to said data storage system, wherein a first request by said first host that is not handled by said data storage system within said threshold will trigger a fault in said data storage system as identified by said first host.

5. The method of claim 2, wherein said bringing said second controller back on-line comprises:
   enabling mirroring between said first controller and said second controller after said second controller is back on-line.

6. The method of claim 1, wherein said performing a failover comprises:
   taking said first controller off-line after said second controller is back on-line, wherein said second controller is configured to handle IOs, wherein data in said first NVM is stale.

7. The method of claim 1, wherein said taking said second controller off-line comprises:
   breaking a mirroring process between said first controller and said second controller while said first controller is in said active mode.

8. The method of claim 1, wherein said updating data in said first NVM comprises:
   enabling mirroring between said first and second controllers;
   catching up a first state of data stored in said first NVM of said second format with a second state of data stored in said second NVM of said second format; and
   bringing said first controller back online in said standby mode after said first state matches said second state.

9. The method of claim 1, wherein a size of a metadata object in said second format is larger than a size of a metadata object in said first format.

10. A data storage system, comprising:
    a first controller comprising a first non-volatile memory (NVM) for handling IOs and a first central processing unit (CPU), wherein said first controller is in an active mode in an initial state of said data storage system;
    a second controller comprising a second NVM for handling IOs and a second CPU, and wherein said second controller is in a standby mode in said initial state;
    a solid state drive (SSD) configured as a read cache or stable storage medium; and
    a hard drive (HDD) configured for permanent data storage, wherein during reformatting of said first NVM and said second NVM from a first format to a second format, said first controller and said second controller are configured to:
take said second controller off-line such that data in said second NVM is stale;
reformat said second NVM to said second format while said second controller is off-line;
operate said second NVM as a staging buffer to maintain data integrity of said data storage system, wherein said first controller and said second controller are configured to copy content of said first NVM configured in said first format to said second NVM configured in said second format;
perform a failover to said second controller;
reformat said first NVM in said first controller to said second format after failover to said second controller is complete;
update data in said first NVM to mirror data in said second NVM in said second controller while said first controller is off-line; and
bring said first controller back on-line in said standby mode.

11. The data storage system of claim 10, wherein said first controller and said second controller, when said second NVM is operated as a staging buffer, are configured to:
block handling of IOs at said first controller after reformatting of said second NVM is complete;
copy said content while said first controller is blocked from handling IOs; and
bring said second controller back on-line, wherein said second controller is in said standby mode.

12. The data storage system of claim 11, wherein said first controller and said second controller are configured to map said data stored in said first NVM configured in said first format to data stored in said second NVM configured in said second format.

13. The data storage system of claim 11, wherein said first controller and said second controller are configured to block handling of IOs and copy data stored in said first NVM to said second NVM over a period that is less than a threshold defined for a first host making access requests to said data storage system, wherein a first request by said first host that not handled by said data storage system within said threshold will trigger a fault in said data storage system as identified by said first host.

14. The data storage system of claim 11, wherein said first controller and said second controller are configured to enable mirroring between said first controller and said second controller to bring said second controller back on-line after said second controller is back on-line.

15. The data storage system of claim 10, wherein said first controller and said second controller are configured to take said first controller off-line after said second controller is back on-line during said failover, wherein said second controller is configured to handle IOs, wherein data in said first NVM is stale.

16. The data storage system of claim 10, wherein said first controller and said second controller are configured to break a mirroring process between said first controller and said second controller while said first controller is in said active mode to take the second controller off-line.

17. The data storage system of claim 10, wherein said first controller and said second controller when data is updated in the first NVM are configured to:
enable mirroring between said first and second controllers;
catch up a first state of data stored in said first NVM of said second format with a second state of data stored in said second NVM of said second format; and
bring said first controller back online after said first state matches said second state.

18. A non-transitory computer-readable medium storing a computer program for upgrading a data storage system, said computer-readable medium comprising program instructions to:
operate a first controller in an active mode and a second controller in a standby mode in a data storage system, wherein first and second non-volatile memories (NVMs) configured in a first format in said first and second controllers, respectively, are initially mirrored in a first format;
take said second controller off-line such that data in the second NVM of said second controller is stale;
reformat said second NVM to a second format while said second controller is off-line;
operate said second NVM as a staging buffer to maintain data integrity of said data storage system, including copying content of said first NVM configured in said first format to said second NVM configured in said second format;
perform a failover to said second controller;
reformat said first NVM in said first controller to said second format after failover to said second controller is complete;
update metadata in said first NVM configured in said second format to mirror metadata in said second NVM configured in said second format while said first controller is off-line; and
bring said first controller back on-line in said standby mode.

19. The computer-readable medium of claim 18, wherein said program instructions to operate said second NVM as a staging buffer further comprise program instructions to:
block handling of IOs at said first controller after reformatting of said second NVM is complete;
copy the content while said first controller is blocked from handling IOs; and
bring said second controller back on-line, wherein said second controller is in said standby mode.

20. The computer-readable medium of claim 19, further comprising program instructions to:
perform said blocking handling of IOs and said copying metadata stored in said first NVM to said second NVM over a period that is less than a threshold defined for a first host making access requests to said data storage system, wherein a first request by said first host that not handled by said data storage system within said threshold will trigger a fault in said data storage system as identified by said first host.

21. The computer-readable medium of claim 19, further comprising program instructions to:
enable mirroring between said first controller and said second controller after said second controller is back on-line.

22. The computer-readable medium of claim 18, wherein program instructions to update metadata in said first NVM comprise program instructions to:
enable mirroring between said first and second controllers;
catch up a first state of data stored in said first NVM of said second format with a second state of data stored in said second NVM of said second format; and bring said first controller back online after said first state matches said second state.

* * * * *